United States Patent [19]
Fujita et al.

[11] Patent Number: 6,096,969
[45] Date of Patent: *Aug. 1, 2000

[54] APPARATUS ADAPTED TO USE SOLAR BATTERY

[75] Inventors: Masahiro Fujita; Takayuki Tsuboi, both of Kanagawa-ken, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/561,046

[22] Filed: Nov. 20, 1995

[30] Foreign Application Priority Data

Nov. 22, 1994 [JP] Japan ................................. 6-311352

[51] Int. Cl.[7] .......................... H01L 31/00; H01L 25/00; H04M 1/00
[52] U.S. Cl. ...................... 136/259; 136/245; 136/246; 136/251; 136/291; 379/440; 379/457
[58] Field of Search .................................. 136/245, 246, 136/251, 259, 291; 354/429, 477, 484; 379/440, 457

[56] References Cited

U.S. PATENT DOCUMENTS 4,421,943  12/1983  Withjack ................................. 136/246
5,221,363   6/1993  Gillard .................................... 136/248

Primary Examiner—Nam Nguyen
Assistant Examiner—Steven H. VerSteeg
Attorney, Agent, or Firm—Robin, Blecker & Daley

[57] ABSTRACT

An apparatus comprising a solar battery, or a device adapted to be used with the apparatus, includes a first arrangement for driving the apparatus into a redetermined state so as to prevent the apparatus from being adversely affected by heat from illumination light impinging on the solar battery, and a second arrangement for driving the apparatus into a state different from the predetermined state by using a driving force of the first arrangement.

49 Claims, 22 Drawing Sheets

1

APPARATUS ADAPTED TO USE SOLAR BATTERY

BACKGROUND OF THE INVENTION

1. Field of the Invention

This invention relates to an improvement of an apparatus such as a camera or the like adapted to use a solar battery.

2. Description of the Related Art

An arrangement for causing the body of an apparatus having a panel to which a solar battery is attached and a secondary battery which is disposed within the body to be cooled by forming an air layer between the apparatus body and the panel, has been disclosed in U.S. patent application Ser. No. 08/257,117. An electronic apparatus developed as an improvement of this arrangement has been proposed in U.S. patent application Ser. No. 08/362,992. The improved electronic apparatus is designed to be capable of protecting the secondary battery and other parts vulnerable to heat even under such conditions that tend to cause the solar battery to have a high temperature. The electronic apparatus, which is a camera in this case, is arranged as described below with reference to FIGS. 16(a) to 16(c) through FIG. 20.

FIGS. 16(a) to 16(c) are views showing the camera as viewed from its bottom side which is opposite the side on which the shutter release button is located. FIG. 16(a) shows the camera in a portable, closed state. FIG. 16(b) shows the camera in a standby state with lens barrel 1b extended from a retracted state is as shown in FIG. 16(a). FIG. 16(c) shows the camera in a state having front cover 2 popped up for avoiding heat damage when generating electrical energy by placing the camera in direct sunlight so as to apply intense light to solar battery cells 2a. The state shown in FIG. 16(c) hereinafter will be called a pop-up state. FIG. 17 is an oblique view showing the camera as viewed from the side on which the shutter release button is provided. FIGS. 18 and 19 are views showing the internal structure of the safety arrangement which brings about the pop-up state as shown in FIG. 16(c).

Referring to these figures, the camera body 1 includes photo-taking lens barrel 1b which is adapted to be extended from a retracted position to a photo-taking position in the standby state as shown in FIG. 16(b), a stopper part 1c which will be described later and an aperture part (for a film cassette) which is not shown but is located in a lower part as viewed from these figures. A lithium-ion secondary battery 1a is installed in a built-in fashion within the camera body in a position as indicated by the broken line in FIG. 17.

The front cover 2 is arranged to be rotatable on a rotation shaft 2c which is fitted in holes (not shown) provided in the camera body 1. A torsion spring 4 which is shown in FIG. 19 is arranged to constantly urge the front cover 2 to swing counterclockwise. In the portable, closed state as shown in FIG. 16(a), however, the front cover 2 is kept in this state by the action of a first lock claw 6. Five amorphous semiconductor solar battery cells 2a are disposed on the outer surface of the front cover 2 as shown in FIG. 17. The solar battery cells 2a are series-connected as shown in FIG. 20. When the sunlight falls on the solar battery cells 2a, an electrical current is generated. Then, the lithium-ion secondary battery 1a is charged by flow of the electrical current through a reverse-blocking diode 21 (see FIG. 20). The front cover 2 is provided further with a cutout part 2b which is arranged to guide a slidable operation knob 3b, a shutter release button 2d, a pop-up button 2e for bringing about the pop-up state in response to an external operation thereon, a strap attaching part 2f and a strap 2g which is attached to the strap attaching part 2f. Further, as shown in FIGS. 18 and 19, a shaft 2h is arranged to slidably guide a main switch lever 3 on the inner side of the front cover 2 in a part hidden from the sight of the camera user.

The main switch lever 3 has slots 3a which are fitted on the shaft 2h and is thus carried by the shaft 2h to be slidable to the right or left as shown in FIG. 19. A spring 5, one end of which is hooked on an arm part 3c of the main switch lever 3, is arranged to constantly urge the main switch lever 3 to the left as viewed in FIG. 19. The main switch lever 3 is locked to its position shown in FIG. 19 by means of a stopper which is not shown. The main switch lever 3 is provided with an operation knob 3b which is provided for operation by the camera user, a tapered protruding part 3d which is arranged to push an unlocking part 6c of the first lock claw 6 provided for locking the front cover 2, and a lock part which is not shown but is arranged to keep the camera body 1 and the front cover 2 in a positional relation as shown in FIG. 16(b).

The first lock claw 6 has a hole 6a fitted on a shaft (not shown) provided within the camera body 1 and is thus swingably carried by that shaft. A spring 7 which has one end of it hooked on one end of an arm part 6d of the first lock claw 6 is arranged to constantly urge the first lock claw 6 to swing clockwise. A stopper which is not shown is arranged to keep the first lock claw 6 in its position shown in FIG. 19 when the camera is in the state shown in FIG. 16(b). A lock part 6b of the first lock claw 6 is arranged to be movable back and forth into and out of a slot 8b of a lock lever 8. In the portable, closed state as shown in FIGS. 16(a), etc., the lock part 6b has been moved forward to be fitted into the slot 8b of the lock lever 8 and to keep the front cover 2 in its closed position of FIG. 16(a) against the urging force of the torsion spring 4. When the unlocking part 6c of the first lock claw, which is located on the opposite side of the lock part 6b, is pushed by the tapered protruding part 3d of the main switch lever 3, the first lock claw 6 is caused to swing counterclockwise against the urging force of the spring 7. The swing motion retracts the lock part 6b away from the slot 8b to unlock the front cover 2. As a result, the portable, closed state of FIG. 16(a) changes into the standby state as shown in FIG. 16(b).

The lock lever 8 has a hole 8a in which a shaft (not shown) of the front cover 2 is fitted and is thus swingably carried by that shaft. The slot 8b of the lock lever 8 is arranged to allow the lock part 6b of the first lock claw 6 to be fitted therein as mentioned above. In the states shown in FIGS. 16(a), 16(b), and 19, a lock claw part 8c of the lock lever 8 is in mesh with a lock claw part 9b of a second lock claw 9. Therefore, the lock lever 8 is kept together with the front cover 2. In the pop-up state shown in FIG. 16(c), an L-shaped part of the lock claw part 8c of the lock lever 8 is abutting on a stopper part 1c of the camera body 1. The camera is thus arranged such that, even if the front cover 2 is pulled up inadvertently by the user in this state, the pulling force is not directly exerted on the first lock claw 6.

The second lock claw 9 is swingably supported by a shaft (not shown) of the front cover 2 with the shaft fitted in a hole 9a of the second lock claw 9. A spring 10 which is hooked on one end of an arm part 9d of the second lock claw 9 is arranged to constantly urge the second lock claw 9 to swing counterclockwise. The second lock claw 9 is, however, kept in the state shown in FIG. 18 by a stopper which is not shown. With the second lock claw 9 provided with the lock claw part 9b as mentioned above, in the portable state as shown in FIGS. 19, etc., the lock claw part 8c of the lock lever 8 is in mesh with the lock claw part 9b to prevent the counterclockwise swing. The second lock claw 9 is further provided with a hooking part 9c which is arranged on the side opposite to the lock claw part 9b and has a wire 11 made of a shape memory alloy of nickel and titanium hooked thereon.

The wire 11 which is made of the shape memory alloy is carried by a shaft arranged in a known eccentric manner. The wire 11 is extended along the reverse surface of the front cover 2 through an adjusting pulley 12, with its tension adjusted during the manufacturing process, and is connected to a shaft of the front cover 2 at one end 11a by a known manner (see FIGS. 18 and 19). When intense sunlight is applied to the surfaces of the solar battery cells 2a on the front cover 2 and, if the temperature of the front cover 2 exceeds, say, 65° C., the shape memory alloy wire 11 transforms and shrinks to cause the second lock claw 9 to swing clockwise against the urging force of the spring 10 and thus to disengage the lock claw part 9b from the lock claw part 8c of the lock lever 8.

Further, the camera is arranged such that the lock claw part 8c of the lock lever 8 can be manually unlocked from the lock claw part 9b of the second lock claw 9 by the user by pushing a pop-up button 2e shown in FIG. 17. In this case, the pushing force on the pop-up button 2e acts to swing the second lock claw 9 clockwise.

FIG. 20 shows the power supply circuitry of the camera arranged as described above. Referring to FIG. 20, the solar battery cells 2a are arranged on the front cover 2. The lithium-ion secondary battery 1a is disposed within the camera body 1. A diode 21 is arranged to block the flow of reverse current. An overcharge preventing circuit 22 is arranged in a known manner. A microcomputer 23 is arranged to control the various circuits disposed within the camera body 1. A main switch 24 is arranged to turn on when the front cover 2 is opened.

The camera arranged as described above can be carried by the user in the state shown in FIGS. 16(a), etc., with the strap 2g (FIG. 17) placed on the shoulder of the user. Even while the camera is in such a state, the lithium-ion secondary battery 1a can be charged by light falling on the solar battery cells 2a.

In taking a picture, when the user slides the operation knob 3b of the main thumb switch lever 3 to the right as viewed on FIG. 16(a), the front cover 2 is caused to swing counterclockwise by the urging force of the torsion spring 4. More specifically, with the knob 3b slid to the right from its position shown in FIG. 19, the tapered protruding part 3d pushes the unlocking part 6c of the first lock claw 6 to cause the first lock claw 6 to swing counterclockwise as viewed in the drawing against the urging force of the spring 7. The lock part 6b of the first lock claw 6 then retreats from the slot 8b of the lock lever 8 which is held integrally with the front cover 2. As a result, the front cover 2 is released from a state of being locked to the camera body 1. The front cover 2 is thus allowed to swing counterclockwise by the urging force of the torsion spring 4. (In actuality, the camera body 1 is caused to reactively swing in the opposite direction with the front cover 2 held by the hand.)

When the front cover 2 swings to its position shown in FIG. 16(b), the camera body 1 and the front cover 2 are kept in this positional relation by means of a lock member which is not shown, as mentioned above. The main switch 24 (shown in FIG. 20) then turns on. The lens barrel 1b is drawn out and the camera assumes the standby (photo-taking) state. Then, a picture can be taken, in the same manner as with an ordinary camera, by deciding the composition of the picture by viewing through a viewfinder which is not shown and by pushing the shutter release button 2d.

In bringing the camera from the standby state back to the portable, closed state, the camera is operated as follows. The operation knob 3b of the main switch lever 3 is slid upward, as viewed in FIG. 16(b). The upward sliding motion of the operation knob 3b releases the front cover 2 from the state of being locked to the camera body 1 by the lock part which is not shown. With the front cover 2 thus unlocked, the camera body 1 is caused to swing counterclockwise against the urging force of the torsion spring 4. The lock part 6b of the first lock claw 6 then abuts on the lower face of the lock lever 8 and overrides the latter, as the upper part of the lock part 6b is tapered as shown in FIG. 16(b) while the lower face is chamfered to smooth the overriding motion. As a result, the first lock claw 6 engages the lock lever 8 to bring the camera back to the portable, closed state. In the portable state, the main switch 24 is in an off-state to prevent the camera from responding to any inadvertent pushing operation on the shutter release button 2d.

In a case where the user wishes to charge the battery of the camera under direct sunlight, the pop-up button 2e is pushed by the user in the portable, closed state shown in FIGS. 16(a), etc. The second lock claw 9 is then caused to swing clockwise against the urging force of the spring 10. The lock claw part 9b of the second lock claw 9 then disengages from the lock claw part 8c of the lock lever 8. The front cover 2 is allowed to be swung counterclockwise by the urging force of the torsion spring 4 which is hooked between the front cover 2 and the camera body 1. At this time, the lock part 6b of the first lock claw 6 is still engaging the slot 8b of the lock lever 8. Therefore, the lock lever 8 swings on the hole 8a along with the counterclockwise swinging motion of the front cover 2.

The lock lever 8 and the front cover 2 stop swinging with the lock part 8c of the lock lever 8 coming to abut on the stopper part 1c of the camera body 1. The camera is thus brought into the pop-up state in which the front cover 2 is half open as shown in FIGS. 18 and 16(c). If the camera is left in this state, for example, in a parked automobile in a midsummer outdoor environment, the temperature of the solar battery cells 2a of the front cover 2 rises close to 90° C. However, with the camera in the pop-up state, a thick layer of air A is provided between the camera body 1 and the front cover 2 to prevent the temperature of the camera body 1 from rising to a temperature exceeding 60° C., as when the camera body 1 is under a parasol.

Therefore, the lithium-ion secondary battery 1a which is disposed in the lower part of the camera body and a film have a temperature not exceeding 50° C., which is about the same as the temperature of air inside the automobile. The secondary battery 1a and the film thus would never be substantially damaged even if the camera is left under such a condition over a long period of time.

In a case where the camera is inadvertently left, for example, on the dashboard of an automobile in its portable, closed state and is exposed to high temperature air and high illuminance direct sunlight, a safety arrangement of the camera shows an advantageous effect. Before describing this effect, the state of the camera obtained without the safety arrangement under such conditions is first described.

According to tests conducted by the inventors of the present invention, the temperature obtained inside of an automobile when it is parked under a clear sky in an equatorial area, such as Malaysia, reaches 90° C. or thereabout on the surface of a dashboard and about 85° C. at parts of seats exposed to direct sunlight. Then, the average temperature of convective air inside of the automobile is about 52° C. This condition reaches an equilibrium state in one or two hours after the commencement of exposure to the direct sunlight.

With the camera placed in the above-stated environment, the temperature of the solar battery cells 2a of the front cover 2 exceeds 90° C. in about one hour. The temperature of a thin air layer between the front cover 2 and the camera body 1 and the temperature of the front surface of the camera body 1 also become very high reaching 85° C. or so. (Since the air layer cannot be allowed to be more than several mm in thickness in respect of portability, the speed of convection taking place between the outside air and the air layer is only about several mm/sec due to a viscous resistance between the reverse surface of the front cover 2 and the front surface of the camera body 1. Hence, the air layer hardly has any cooling effect on the reverse surface of the front cover 2.) The heat not only damages parts inside of the camera but also causes the temperature of the lithium-ion secondary battery 1a to exceed 65° C. and that of the film to exceed 60° C., thereby also damaging the secondary battery and the film.

The exposure of the camera in the state shown in FIG. 19 to the above-stated severe ambient condition causes the temperature of the front cover 2 to exceed 65° C. in 20 min or so. Then, the shape memory alloy wire 11 shrinks to cause the second lock claw 9 to swing clockwise. Therefore, as in the case where the pop-up button 2e is pushed, the lock claw part 9b of the second lock claw 9 disengages the lock claw part 8c of the lock lever 8. Then, as mentioned above, the front cover 2 is caused to swing counterclockwise (pop up) by the urging force of the torsion spring 4, following the counterclockwise swing of the lock lever 8 on its hole 8a. As a result, the camera is brought into the pop-up state as shown in FIGS. 16(c) and 18.

With the camera in this state, the air layer between the front cover 2 and the camera body 1 expands from a thickness of tens to scores of mm. Therefore, the expanded air layer permits convective communication with the external air (the maximum temperature of the air is 52° C.). The front cover 2 and the front surface of the camera body 1 are thus cooled down. Particularly, the front surface of the camera body 1 is cooled to about the same temperature as the air temperature inside of the automobile, because it is located under the shadow of the front cover 2. Although the temperature of the front cover 2 may become still higher by absorbing the energy of the sunlight, it never exceeds 90° C. as the reverse surface thereof is cooled by the external air.

The secondary battery and the film which are disposed within the camera body are thus effectively prevented from being damaged even under such a condition that increases the temperature of the solar battery part. Most of the compact cameras are provided these days with protection covers, or barriers, for covering their lenses when they are not used and also with built-in flash devices for shooting under low lumunance conditions. The cameras of this kind, therefore, must be provided with many built-in component parts for performing the above-stated functions. This requirement inevitably results in some increase in size and cost of the compact cameras and also some restriction on their designs.

In this respect, cameras disclosed in U.S. Pat. No. 4,557,571 and U.S. Pat. No. 4,319,818 are arranged to mitigate this shortcoming by having a flash device built in a barrier forming part of the camera and to have the barrier act as a flash device during picture taking, so that a relatively greater number of parts are arranged to perform the combined functions than with other compact cameras.

In the case of another camera disclosed in U.S. Pat. No. 4,897,680, a reflection mirror for performing a light condensing action in a flash device is arranged to open above the camera as necessary.

Among the apparatuses of the prior art cited above, however, the electronic apparatus, i.e., the camera of U.S. patent application Ser. No. 08/362,992 has presented the following problems.

i) The protective case, i.e., the front cover 2, of the camera is arranged to be opened and closed by a manual operation. It is, therefore, difficult to modify this camera into an automatic standby type camera which is arranged to be automatically brought into an operative photo-taking (shooting) state and also to be brought back to a non-operative shooting state. Further, the barrier closing operation necessitates closing the barrier while charging the torsion spring which is arranged to urge the barrier in the direction of opening. Therefore, the camera has poor operability.

ii) An increase in temperature automatically brings the protective barrier to its pop-up position. However, the camera is not designed to automatically bring the barrier back to its original position when the temperature drops.

iii) To solve the problem of the paragraph i) above, if another actuator is arranged to automatically open and close the protective barrier in addition to the actuator used for popping up, it causes an increase in cost.

In the cases of the cameras disclosed in U.S. Pat. No. 4,319,818 and U.S. Pat. No. 4,557,571 and cited above as examples of the prior art, the possibility of having a red-eye phenomenon while taking a portrait is mitigated by arranging the flash device away from the photo-taking optical axis. However, the arrangement of having the light source disposed on the side of the barrier complicates an electrical connection part between the light source and the camera body and thus causes an increase in cost. Further, the arrangement inevitably results in a shorter distance between the light source and a part (such as a Fresnel lens) condensing the light of the light source. The shorter distance thwarts an efficient condensing action.

In another camera disclosed in U.S. Pat. No. 4,897,680, a flash device which is arranged to have only its reflector popped up does not present the above-stated problems of the U.S. patent application cited above. The camera, however, must be provided with protection covers discretely arranged for the photo-taking lens and a viewfinder part. That arrangement thus causes an increase in cost and imposes some restrictions on the design of the camera.

SUMMARY OF THE INVENTION

In accordance with one aspect of this invention, there is provided an apparatus adapted to use a solar battery, or a device to be applied to the apparatus, comprising first means for driving the apparatus into a predetermined state so as to prevent the apparatus from being adversely affected by heat from illumination-light such as a sunlight impinged on the solar battery, and second means for driving the apparatus into a state different from the predetermined state by using a driving force of the first means, so that a reduction in size and cost of the apparatus is attained by using for another purpose a driving force used for preventing the apparatus from being adversely affected by the heat of illumination light impinged on the solar battery.

The above and other aspects and features of the invention will become apparent from the following detailed description of preferred embodiments thereof taken in connection with the accompanying drawings.

DETAILED DESCRIPTION OF THE PREFERRED EMBODIMENTS

Preferred embodiments of this invention are described below with reference to the drawings.

Figure 1:
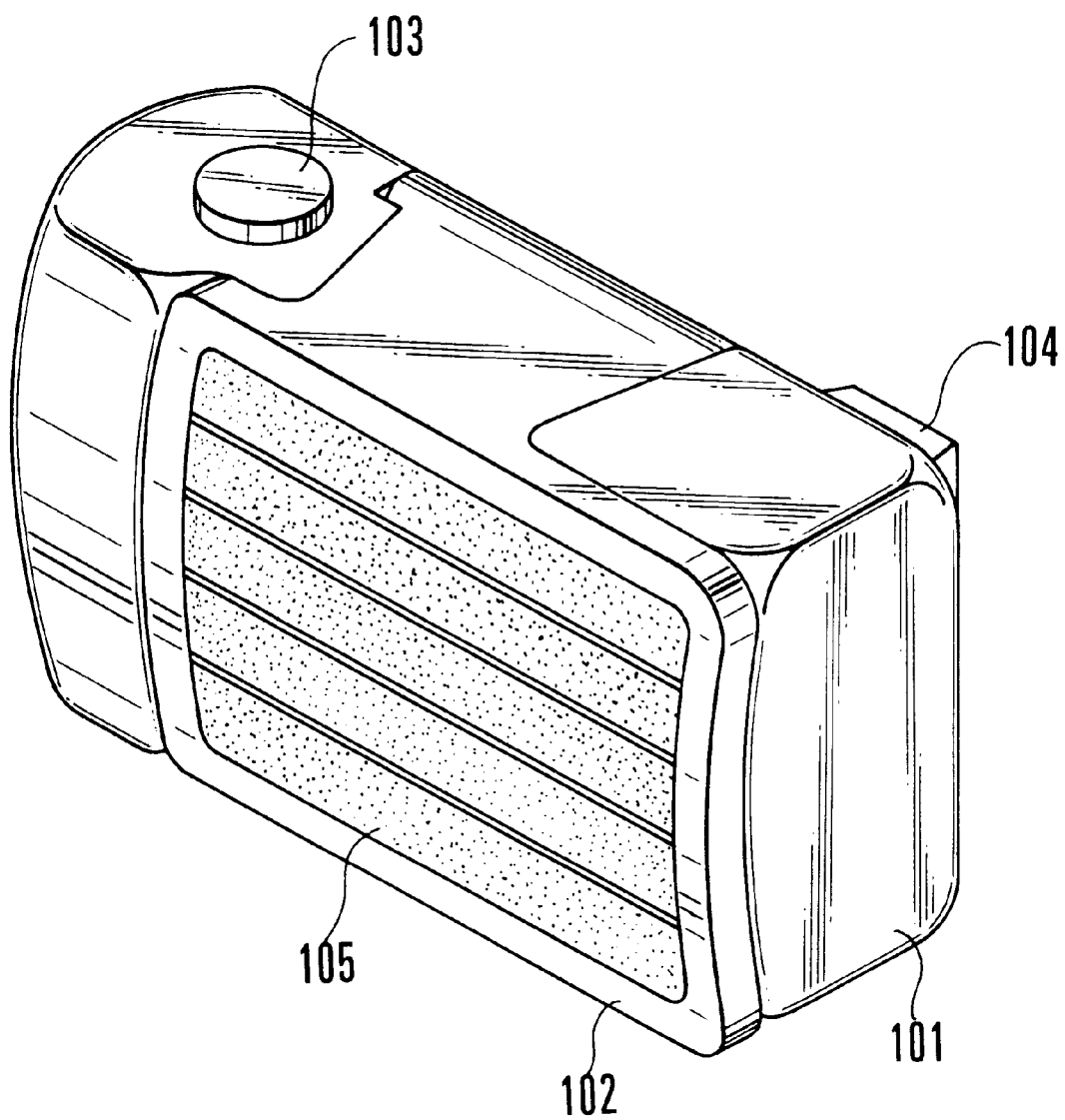
FIG. 1 is a perspective oblique view showing a camera which is arranged as a first embodiment of this invention.
Figure 2:
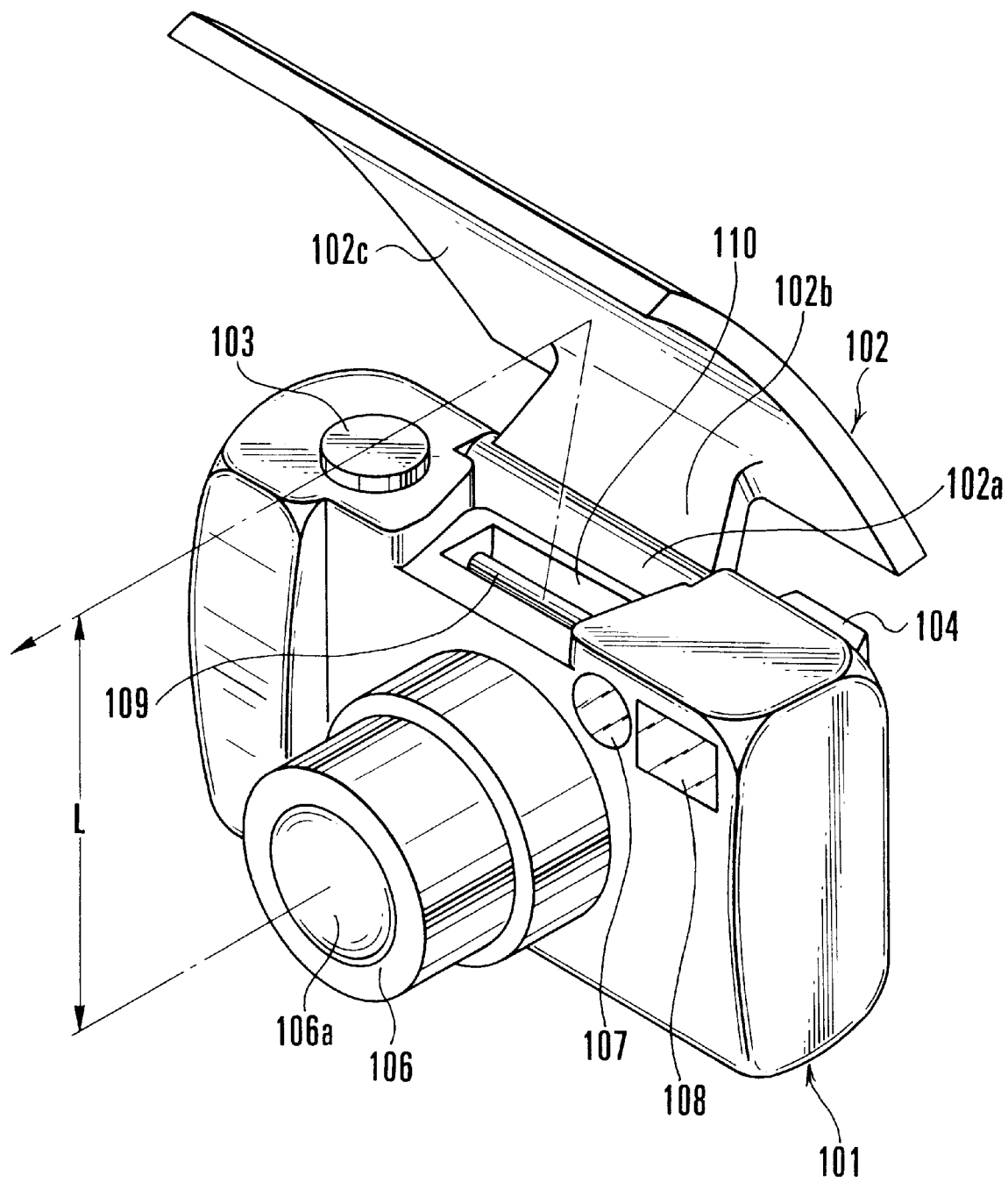
FIG. 2 is a perspective view showing the same camera of FIG. 1 in a state where the barrier is fully opened.
Figure 3:
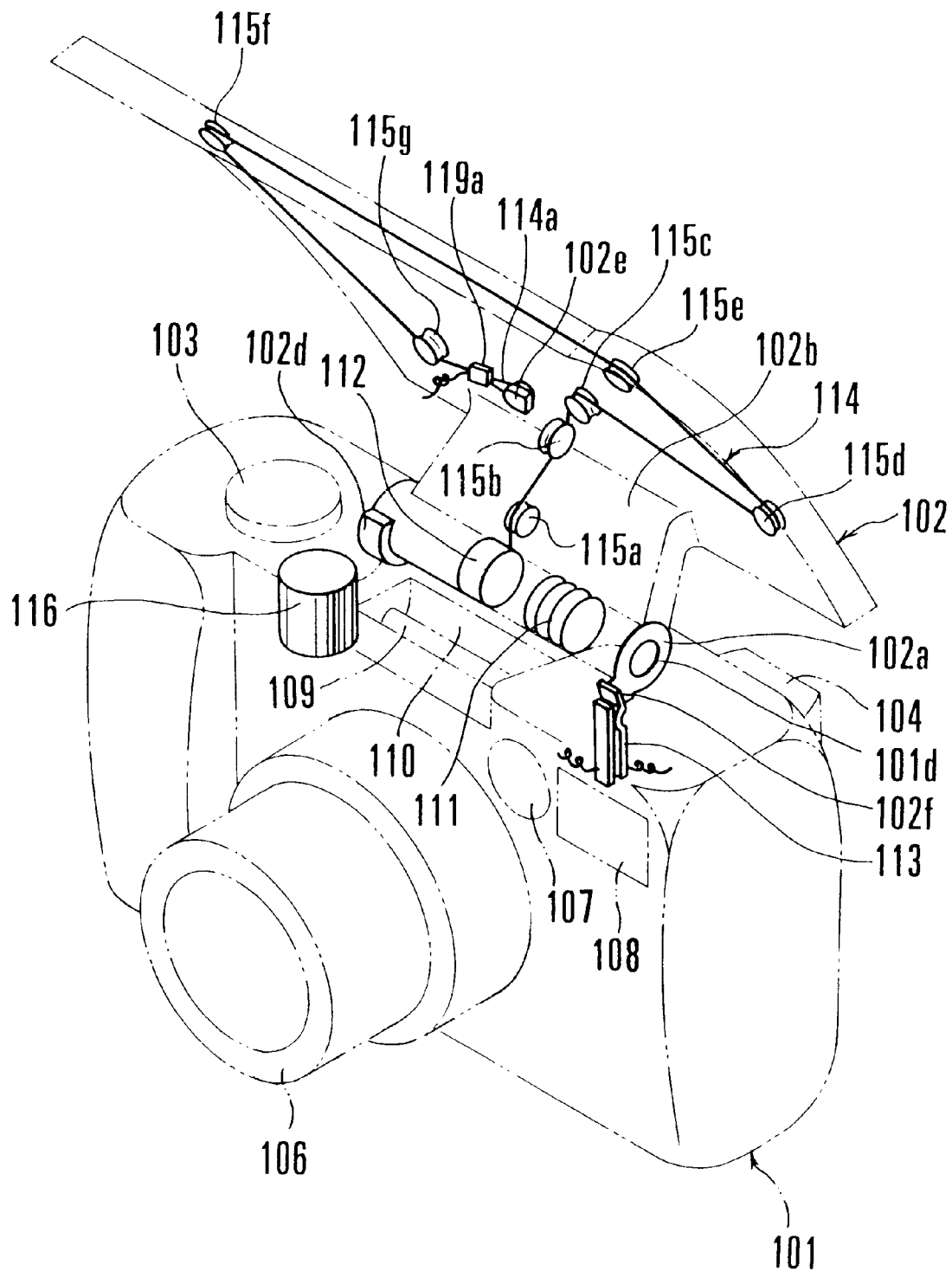
FIG. 3 is a perspective view showing the essential parts of the camera of FIG. 1 in a cut away manner.
Figure 4:
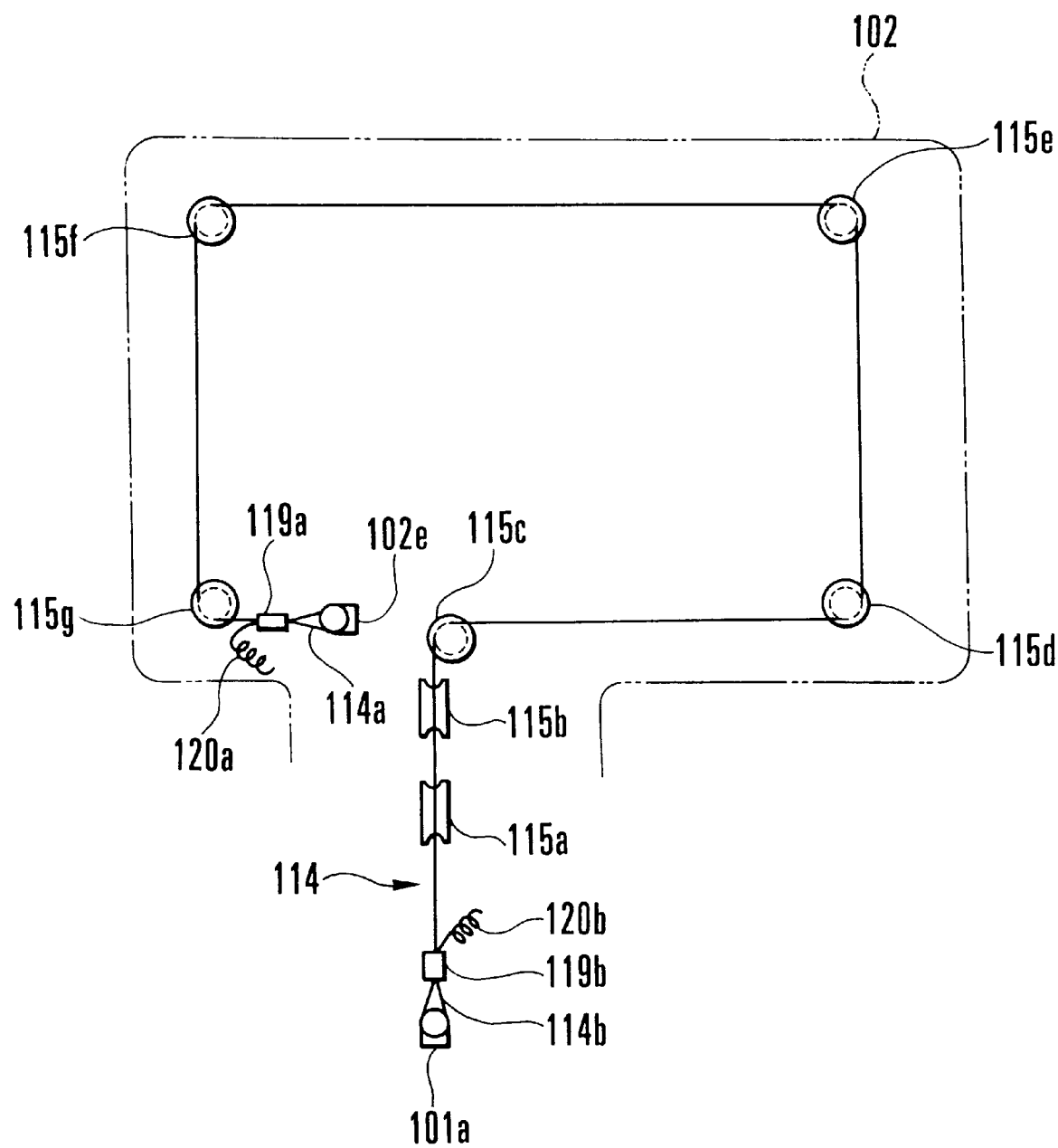
FIG. 4 shows a wire made of a shape memory alloy arranged on the reverse surface of the barrier of FIG. 1.
Figure 5:
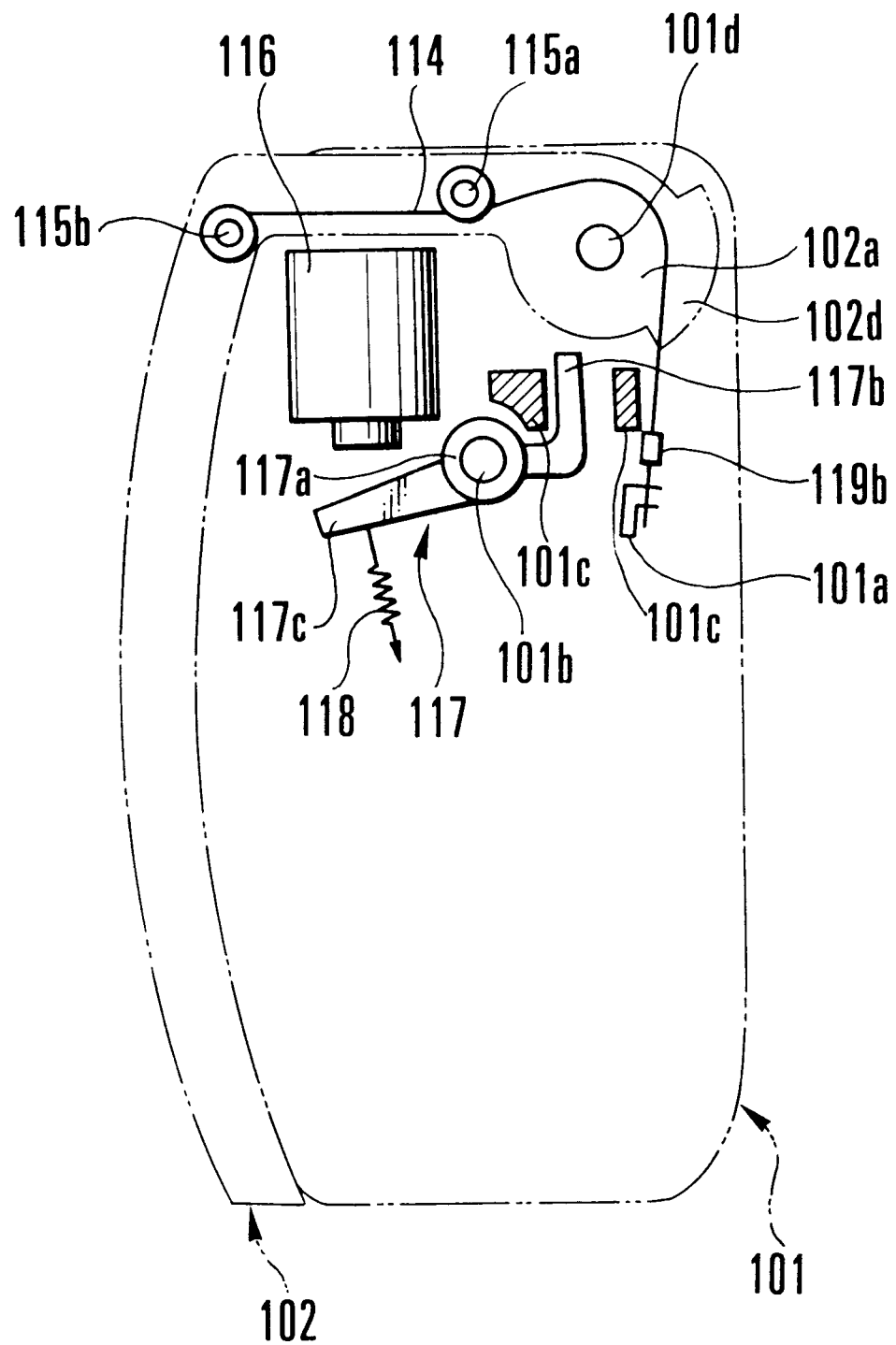
FIG. 5 is a sectional view showing the essential parts of the camera of FIG. 1 when the barrier of the camera is closed.
Figure 6:
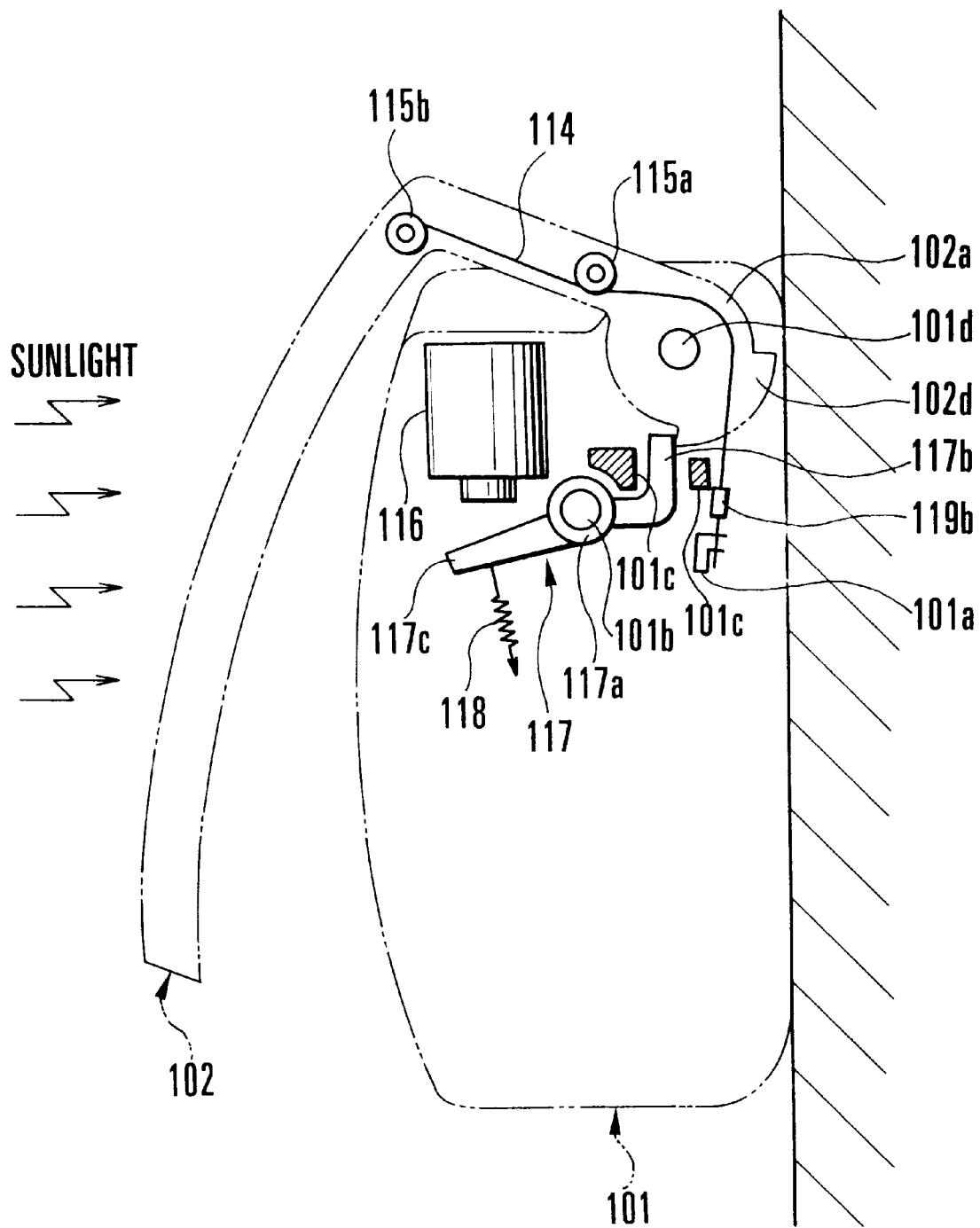
FIG. 6 is a sectional view showing the camera of FIG. 1 obtained when the barrier is caused to pop up from the state shown in FIG. 5 in response to a heat sensing action.
Figure 7:
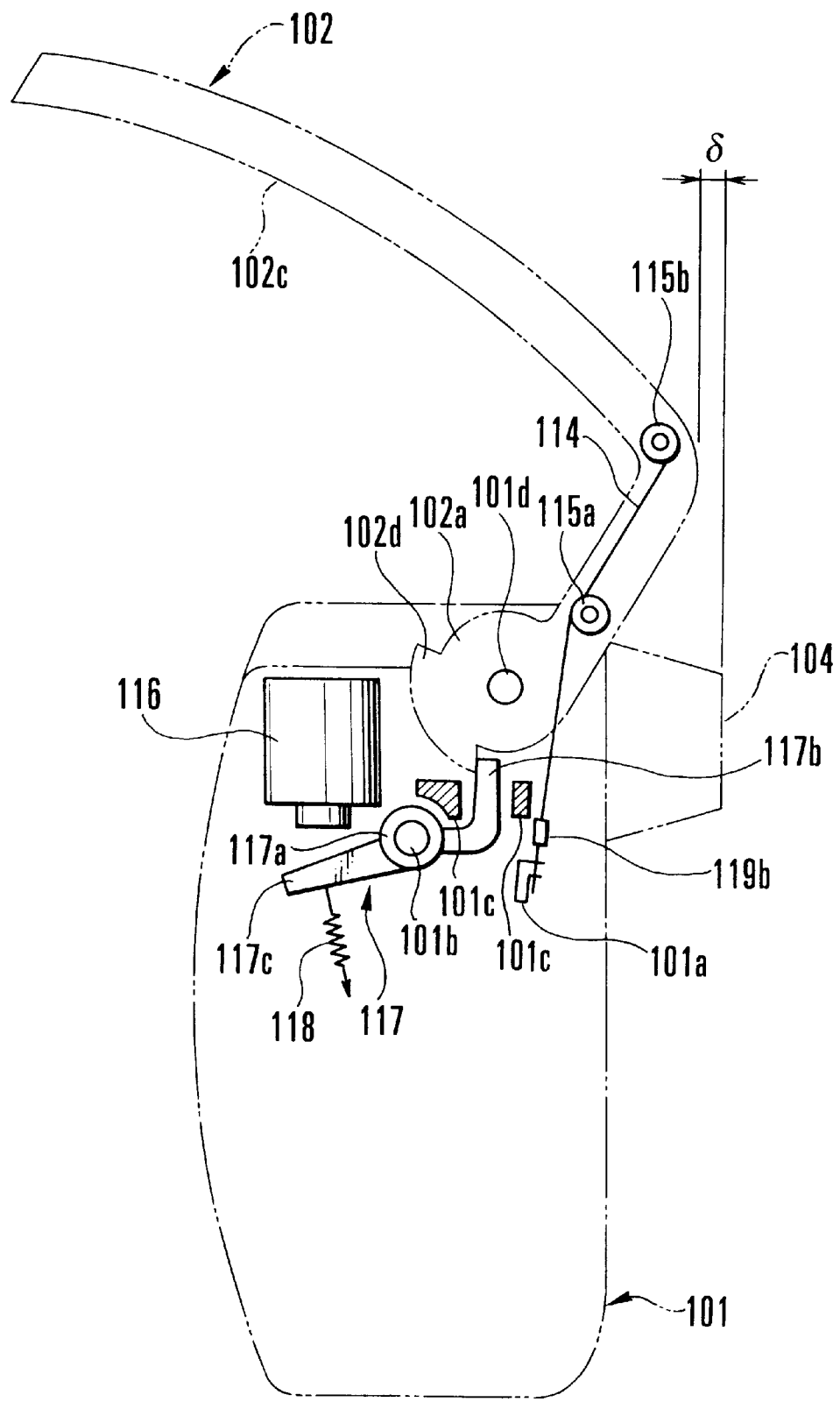
FIG. 7 is a sectional view showing the camera of FIG. 1 in a picture-taking state obtained with the barrier fully opened from the state shown in FIG. 1.

FIGS. 1 to 7 show the mechanical arrangement of a camera to which the arrangement according to the invention is applied as a first embodiment therof. FIG. 1 is a perspective view showing the camera in a portable, closed state in which a barrier, i.e., a protective cover is closed. FIG. 2 is a perspective view showing the camera in a photo-taking state in which the barrier is fully opened. FIG. 3 is a perspective view showing the same camera partly in a cut away manner showing its internal arrangement in the photo-taking state of FIG. 2. FIG. 4 shows a wire which is made of a shape memory alloy and is arranged within the barrier. FIG. 5 is a sectional view showing the pop-up mechanism in the portable, closed state in which the barrier is closed. FIG. 6 is a sectional view showing the camera in the pop-up state in which the barrier is half opened for resisting heat by the action of the shape-memory alloy wire caused by a rise of external temperature. FIG. 7 is a sectional view showing the camera in the photo-taking state in which the barrier is fully opened.

Referring to FIGS. 1 to 7, the camera has a body 101. An openable-and-closable barrier 102, i.e., a protection cover, is arranged to cover the front surface of a zoom lens barrel 106. The camera includes a shutter release button 103, a viewfinder eyepiece 104 and a solar battery 105 consisting of a five solar cells which are connected in series with each other.

The camera body 101 is provided with a hooked part 101a for hooking thereon an end 114b of a wire 114 (see FIG. 4) which is made of a shape memory alloy, a shaft part 101d (see FIGS. 3 and 5 to 7) for supporting a rotation shaft 102a of the barrier 102, a shaft part 101b for swingably supporting a stop claw 117 shown in FIGS. 5 to 7, and a stopper part 101c (see FIGS. 5 to 7) which acts as a support when an external force (a pushing force on the barrier 102 from outside) acts on the stop claw 117.

The barrier 102 is swingably supported by the shaft part 101d of the camera body 101 and is thus arranged to be swingable from the state shown in FIG. 1 to the state shown in FIG. 2. The back surface of the barrier 102 is formed into a reflection mirror part 102c (see FIG. 2) which is arranged to condense light from a built-in flash device and to project it onto the subject field. The reflection mirror part 102c has a concave surface, which has such a shape that the concave surface closely overlaps the convex-shaped front surface of the camera for efficient use of space when the barrier 102 is closed. The reflection mirror part 102c and the rotation shaft 102a are connected into one unified piece (or body) by means of a connection part 102b.

Further, as shown in FIG. 3 and FIGS. 5 to 7, the barrier 102 is provided with a cam part 102d which is formed integrally with the rotation shaft 102a and is arranged to keep the stop claw 117 in its predetermined position, a hooked part 102e which has the other end part 114a of the shape memory alloy wire 114 hooked thereon, and a protruding part 102f which is arranged to turn on and off a barrier switch 113.

The zoom lens barrel 106 which is shown in FIG. 2 is arranged to be automatically pushed forward by a known motor driving means from the retracted state shown in FIG.

1 to a shooting (photo-taking) position as shown in FIG. 2 and back to the retracted position where the barrier 102 can be closed to bring about the portable state of FIG. 1.

The distance from the optical axis of the lens 106a contained in the zoom lens barrel 106 to the center position of the reflection mirror part 102c of the barrier 102 "L" as shown in FIG. 2. In a camera of the described structural arrangement, this distance L can be arranged to be much longer than the distance between the built-in flash device and the optical axis of the lens in an ordinary integrated flash-device type camera, because the area of the barrier 102, i.e., that of the reflection mirror part 102c, is large enough to cover approximately the whole front side of the camera, as apparent from FIG. 1. Therefore, a portrait picture can be satisfactorily taken while avoiding the red-eye phenomenon.

Referring to FIG. 2, a protection glass 107 is arranged to protect the optical system of a known AF system. A protection glass 108 is also arranged to protect the objective lens of a viewfinder unit which is not shown but is arranged to provide an optical path to the viewfinder eyepiece part 104. These protection glass parts 107 and 108 are also covered by the barrier 102 when the camera is in the portable, closed state. A xenon lamp 109 is provided for the flash device. A reflection shade 110 is arranged to guide the light flash emitted from the xenon lamp 109 to the reflection mirror part 102c provided on the reverse side of the barrier 102. These parts are secured to the camera body 101.

Referring to FIG. 3, a barrier spring 111 is arranged to urge the barrier 102 to move in the direction of closing. A main pulley 112 is rotatably supported by the shaft part 101d of the camera body 101 which is coaxial with the rotation shaft 102a of the barrier 102 and is arranged to be rotatable independently of the rotation shaft 102a of the barrier 102. The wire 114 is made of a shape memory alloy which is a Ni—Ti system.

As shown in FIG. 4, the shape memory alloy wire 114 is arranged on the inner side of the barrier 102 with its direction changed by means of pulleys 115a to 115g. The wire 114 is arranged to react (transform) not only to heat caused by energization but also to a local rise of the temperature of the barrier 102. One end 114a of the wire 114 is hooked, with a predetermined tension, on the hooked part 102e of the barrier 102 in the shape of a loop formed about a pipe 119a. The other end 114b of the wire 114 is hooked, with a predetermined tension, on the hooked part 101a of the camera body 101 also in a looped shape formed about a pipe 119b.

The ends 114a and 114b of the wire 114 are connected to an electric circuit of the camera through lead wires 120a and 120b. The wire 114 is thus arranged to be energized through the lead wires 120a and 120b.

Again referring to FIG. 3, a barrier switch 113 is disposed within the camera body 101. In the state shown in FIG. 3, i.e., with the barrier 102 opened, the barrier switch 113 is pushed to turn on by the protruding part 102f provided on the rotation shaft 102a of the barrier 102. With the barrier switch 102 thus turned on, information on the open state of the barrier 102 is transmitted to a microcomputer through a barrier switch detecting circuit.

Referring to FIGS. 5, 6, and 7, a solenoid 116 is arranged to be driven by the microcomputer and a solenoid driving circuit which will be later described. The solenoid 116 acts to attract an armature 117c of a stop claw 117 and is supported within the camera body 101 by a support mechanism which is not shown. The stop claw 117 is rotatably supported by the shaft part 101b of the camera body 101 at its shaft part 117a and includes a claw part 117b and the armature 117c which is arranged to be attracted by the plunger 116. A spring 118 is arranged to urge the stop claw 117 to move counterclockwise (hereinafter referred to as the CCW direction) as viewed in the drawing. The relation between the claw part 117b of the stop claw 117 and the cam part 102d of the barrier 102 is described as follows.

In the states shown in FIGS. 5, 6, and 7, the claw part 117b is located within the locus of rotation of the cam part 102d to prevent the barrier 102 from moving. Therefore, in a charging state in which the camera is placed under direct sunlight whereby intense light is applied to the solar battery 105 to cause it to generate electrical energy for charging the secondary battery, when the ambient temperature around the camera exceeds a predetermined temperature, the wire 114 reacts to the rise of temperature to cause the barrier 102 to pop up into the half-open state as shown in FIG. 6 for resisting heat. The stop claw 117 then acts as a holding member to bring about a cooling state with the cam part 102d abutting one end of the claw part 117b.

When the solenoid 116 is energized to attract the armature 117c, the claw part 117b is retracted from the rotation locus of the cam part 102d to allow the barrier 102 to move. Therefore, with the claw part 117b retracted to the outside of the rotation locus of the cam part 102d, when the wire 114 is energized to cause the barrier 102 to move clockwise (hereinafter referred to as the CW direction) from the state shown in FIG. 5 to the state shown in FIG. 7, the wire 114 reacts to the heat of energizing to exert a tensile force, which causes the barrier 102 to move in the CW direction against the urging force of the spring 111 shown in FIG. 3 to bring about the full open state of FIG. 7.

When the camera assumes this state, the barrier switch 113 is pushed to turn on by the protruding part 102f of the barrier 102. With the barrier switch 113 turned on, the solenoid 116 is deenergized. The claw part 117b of the stop claw 117 then comes back into the rotation locus of the cam part 102d of the barrier 102. Then, the wire 114 is also deenergized and returns from its contracted state back to its original state. Although the wire 114 is thus deenergized, the barrier 102 is not caused to move in the CCW direction by the urging force of the spring 111, since the claw part 117b of the stop claw 117 is within the rotation locus of the cam part 102d. In other words, in this state, the other end of the claw part 117b of the stop claw 117 acts as a holding member for holding the barrier 102 in its full open state in which pictures can be taken.

Further, in each of the states shown in FIGS. 5 to 7, even if an external force is exerted on the barrier 102, parts forming the stop claw mechanism such as the stop claw 117, etc., are never damaged, because the force is applied only to the nearby stopper part 101c of the camera body 101 through the claw part 117b.

In FIG. 7, reference symbol & denotes an extent to which the viewfinder eyepiece 104 protrudes from the rear of the camera. This position of the eyepiece 104 effectively prevents the barrier 102 from hitting the head of the camera user in the process of taking a picture.

Figure 8:
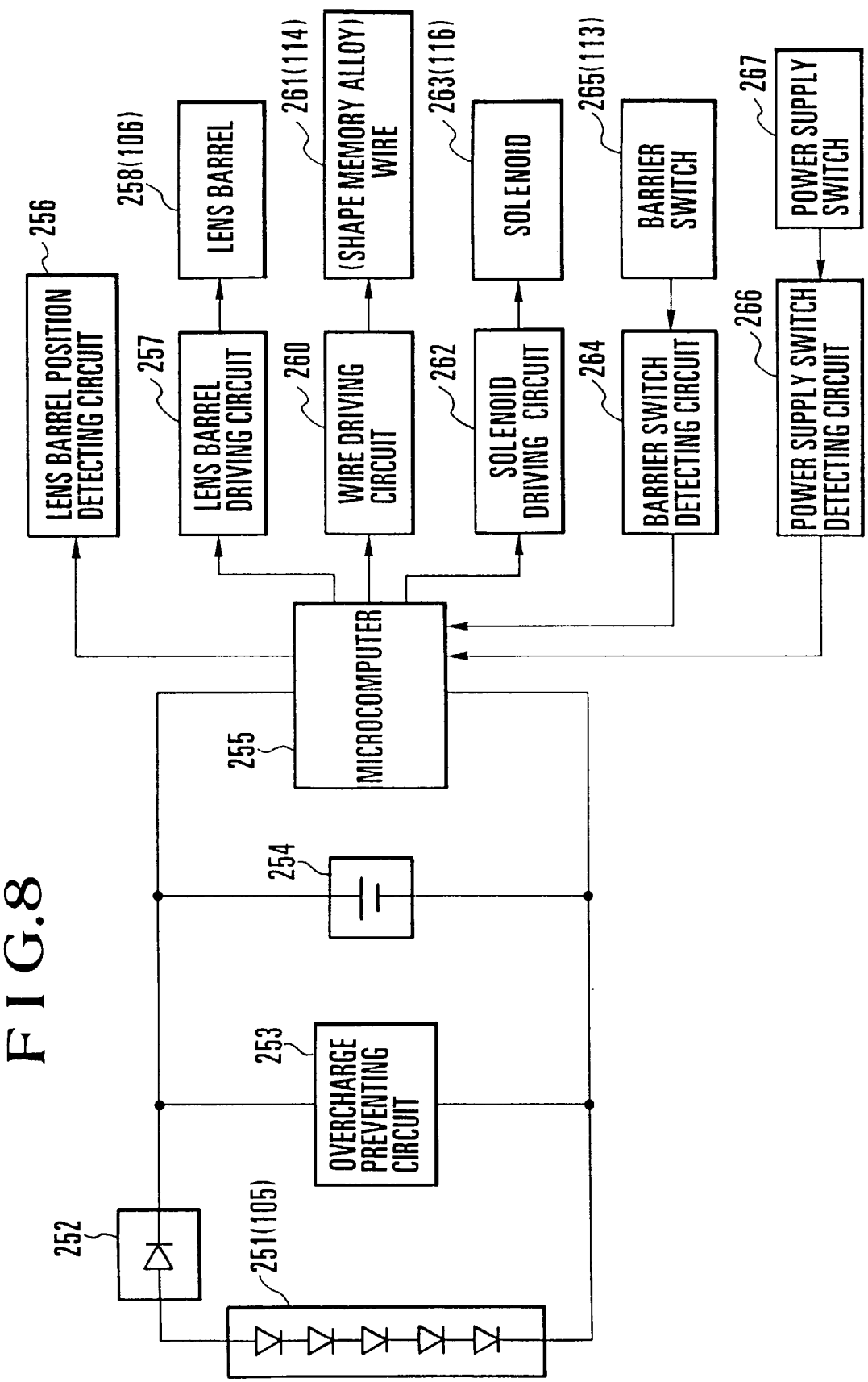
FIG. 8 is a block diagram showing the arrangement of the essential circuits and parts of the camera arranged as the first embodiment of this invention.

FIG. 8 is a block diagram showing the essential circuits of the electronic apparatus, i.e., the camera, which has the mechanical structure described above.

Referring to FIG. 8, solar battery 251 corresponds to the solar battery 105 shown in FIG. 1. The camera has a reverse-blocking diode 252. An overcharge preventing circuit 253 is arranged to prevent secondary battery 254 which is a lithium-ion battery or the like from being overcharged. A microcomputer 255 is arranged to control various circuits of the camera. A lens barrel position detecting circuit 256 is arranged to detect the current position of lens barrel 258 which corresponds to the lens barrel 106 of FIG. 2. A lens barrel driving circuit 257 is arranged to be controlled by the microcomputer 255 on the basis of information on the current lens barrel position coming from the lens barrel position detecting circuit 256 and to drive the lens barrel 258 under the control of the microcomputer 255.

A wire driving circuit 260 is arranged to drive wire 261 which corresponds to the wire 114 shown in FIG. 2, etc. A solenoid driving circuit 262 is arranged to drive a plunger 263 which corresponds to the solenoid 116 shown in FIG. 3, etc. A barrier switch detecting circuit 264 is arranged to detect the state of barrier switch 265 which corresponds to the barrier switch 113 of FIG. 3 and is arranged to change its state according to the opening or closing action of the barrier 102. A power supply switch detecting circuit 268 is arranged to detect the state of power supply switch 267.

With the camera arranged in the manner described above, the operations of the camera are described below, beginning with an operation performed when the barrier 102 is automatically caused to pop-up by the heat sensitive action of the shape memory alloy wire 261.

When sunlight falls on the solar battery 251 (105) which is disposed on the outer surface of the barrier 102, the solar battery 251 (105) generates electrical energy. Then, the secondary battery 254 which is a lithium-ion battery or the like is charged with the electrical energy coming from the solar battery 251 (105) through the reverse-blocking diode 252. If the camera is left under such a condition, the surface temperature of the barrier 102 would reach 80° C., sufficient to damage the various parts disposed within the camera body 101. Besides, film disposed within the camera would be also damaged if the temperature exceeds 60° C.

In this embodiment, therefore, the wire 261 (114) which is made of a shape memory alloy is arranged on the reverse side of the barrier 102 to sense heat and to transform, or contract, at a temperature of 55° C. When the wire 261 (114) shrinks, the barrier 102 automatically assumes its pop-up position by swinging in the CW direction against the urging force of the spring 111 from its closed position of FIG. 5 until the cam part 102d comes to abut one end of the claw part 117b of the stop claw 117. As a result, an air layer having a large thickness is formed between the camera body 101 and the barrier 102. The inside temperature of the camera is effectively suppressed from rising and the adverse effect of heat can be prevented by virtue of the air layer.

Further, when the surface temperature of the barrier 102 drops, the wire 261 (114) expands from the contracted shape to its original shape. Then, the barrier 102 returns from its half opened position of FIG. 6 to the closed position of FIG. 5 by the urging force of the spring 111 which is urging the barrier 102 in the closing direction.

Figure 9A:
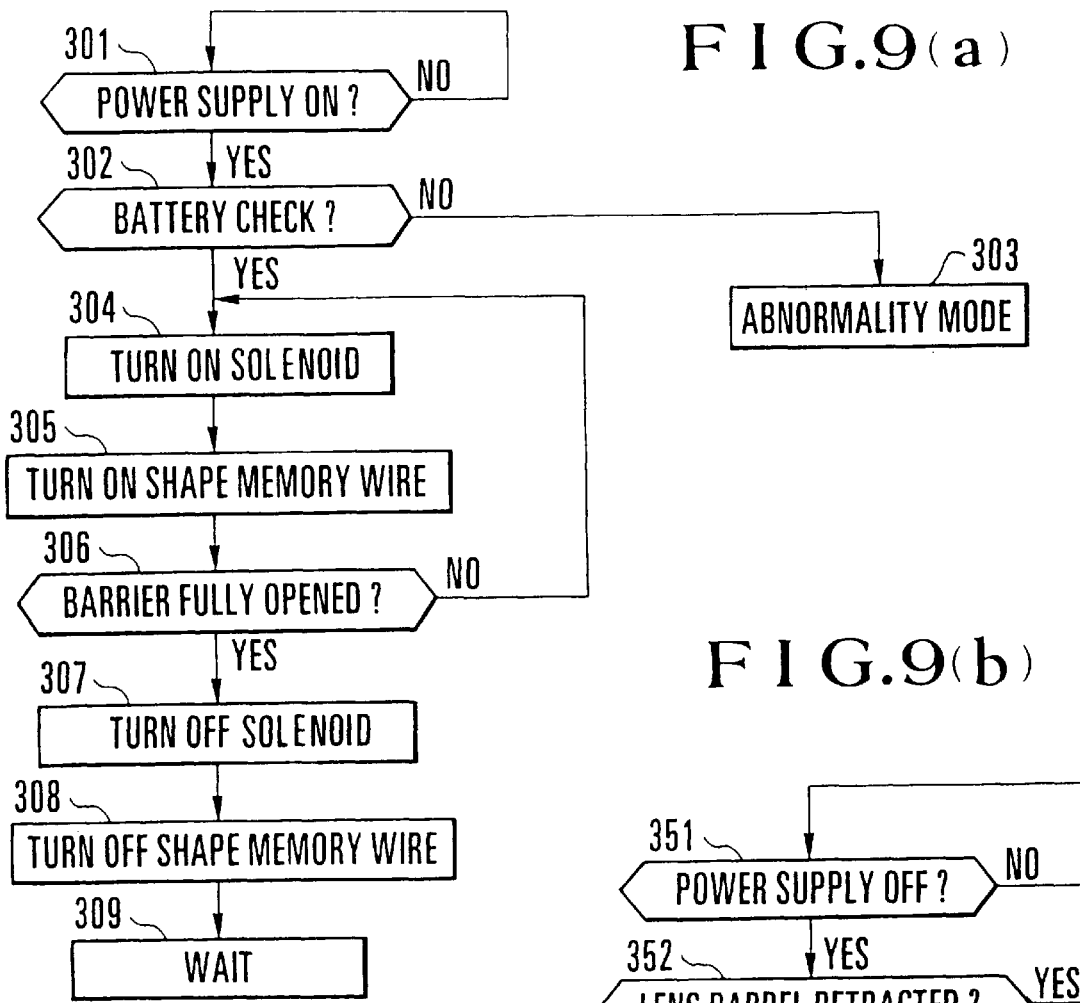
FIGS. 9(a) and 9(b) are flow charts showing the actions performed when the power supply is turned on and turned off in the camera of the first embodiment of this invention.

The operations to be performed by the microcomputer 255 in fully opening the barrier 102 to the photo-taking state is next described with reference to the flow chart of FIG. 9(a) as follows.

At a step 301, the microcomputer 255 first causes the power supply switch detecting circuit 266 to make a check to determine if the power supply switch 267 is closed. If so, the operation proceeds to step 302. At step 302, a check is made on the state of the secondary battery 254 which is disposed within the camera body 101. If the amount of energy stored in the secondary battery 254 is found to be less than a predetermined value, the flow comes to step 303 which indicates an abnormality mode. In the abnormality mode, a warning is given by a display or the like to inform the camera user of the insufficient charge state of the secondary battery 254.

If the charge state of the secondary battery 254 is found to be greater than the predetermined value at step 302, the flow continues to step 304. At the step 304, the solenoid driving circuit 262 is caused to actuate the solenoid 263 (116). At the next step 305, the wire driving circuit 260 is caused to energize the wire 261 (114).

The armature 117c of the stop claw 117 is then attracted by the solenoid 263 (116). The claw part 117b of the stop claw 117 is retracted from the rotation locus of the cam part 102d of the barrier 102 to make the barrier 102 free to move. In addition to this change, heat generated by energizing the wire 261 (114) causes the wire 261 (114) to transform and contract. The contraction of the wire 261 (114) causes the barrier 102 to open from its position shown in FIGS. 5 and 1 to its full open position as shown in FIGS. 7 and 3.

At step 306, the barrier switch detecting circuit 264 is caused to make a check of the state of the barrier switch 265 (113) to determine if the barrier 102 is fully opened. If not (due to insufficient heat), the flow comes back to the step 304 to repeat the steps 304 and 305. When the full open state of the barrier 102 is detected, the flow proceeds from step 306 to step 307. At step 307, the solenoid 263 (116) is deenergized. At the next step 308, the wire 261 (114) is also deenergized. The flow then comes to step 309 to enter a waiting state.

With the wire 261 (114) deenergized immediately after the barrier 102 is fully opened, the wire 261 (114) resumes its original state. In this instance, since the stop claw 117 is caused by the urging force of the spring 118 to move in the CCW direction with the solenoid 263 (116) also deenergized, the barrier 102 is kept in the full open position with the stop claw 117 acting as a stopper by abutting the other end of the cam part 102d of the rotation shaft 102a of the barrier 102, as shown in FIG. 7. The arrangement of deenergizing the wire 261 (114) and the solenoid 263 (116) with the barrier 102 fully opened, effectively saves electric energy from being wasted.

Figure 9B:
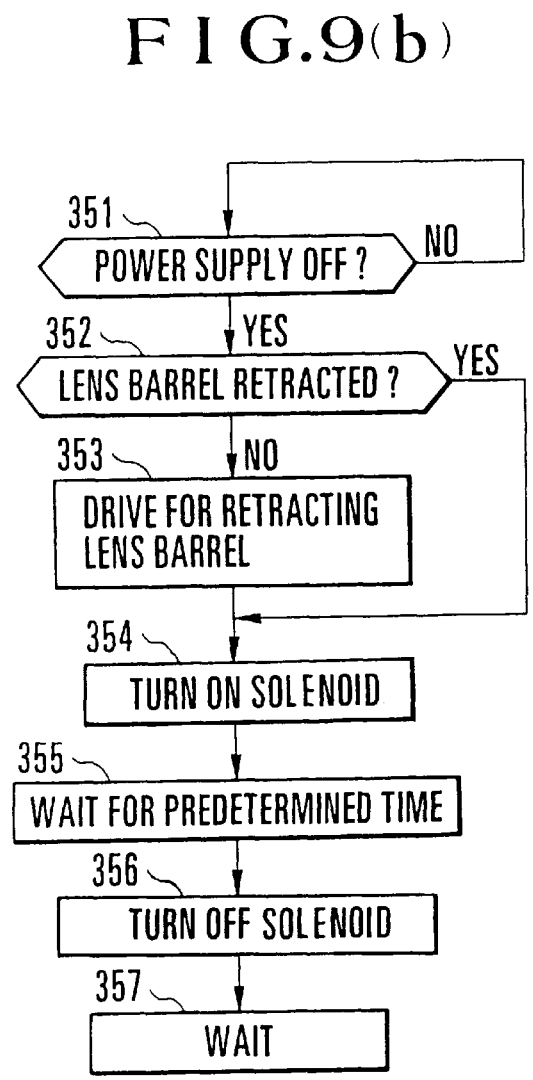

An operation of the embodiment to be performed by the microcomputer 255 in closing the barrier 102 from its full open position is next described with reference to the flow chart of FIG. 9(b) as follows.

At step 351, the power supply switch detecting circuit 266 is checked to determine the state of the power supply switch 267. If the power supply switch 267 is found to be in an off-state, the flow continues to step 352. At step 352, a signal outputted from the lens barrel position detecting circuit 256 is checked to determine if the lens barrel 258 (106) is retracted. If not, the flow continues to step 353. At step 353, the lens barrel driving circuit 257 sets the lens barrel 258 (106) in its retracted state, while monitoring the output of the lens barrel position detection circuit 256. At step 354, the solenoid plunger 263 (116) is energized. At step 355, the flow of operation waits for the lapse of a sufficient period of time for allowing the cam part 102d of the barrier 102 to pass through the claw part 117b of the stop claw 117. At step 356, the energizing of the solenoid 263 (116) stops. As a result, the claw part 117b of the stop claw 117 is temporarily retracted from the rotation locus of the cam part 102d of the barrier 102. Then, within the above-stated predetermined period of time, the barrier 102 is caused by the urging force of the spring 111 to return to its position shown in FIG. 5 or 1. After that, the claw part 117b of the stop claw 117 enters the rotation locus of the cam part 102d of the barrier 102.

After step 356, the flow continues to step 357 to wait for an input from some other switch.

The arrangement of the first embodiment described above has the following advantages.

i) In the camera having the solar battery mounted on the barrier which is a protection cover, an actuator which is provided for protecting the film etc., from heat and another actuator which is provided for automatically opening the barrier by turning on the power supply are designed as a common actuator, which is a wire made of a shape memory alloy. In addition, a member used for closing the barrier when the temperature drops and another member used for automatically closing the barrier, for example, when the power supply is turned off are designed as a common member, which is the spring 111. This arrangement effectively contributes to reduction in size and cost as well as simplification of the structural arrangement of the camera.

ii) The wire made of a shape memory alloy is arranged to be reactive both to the heat sensing action and to heat resulting from energizing. This feature also effectively contributes to reduction in size and cost and simplification of the structural arrangement.

iii) Members used for holding the barrier in its full open state and members used for holding the barrier in a state of being opened to a predetermined extent are designed as the same members (including the cam part 102d provided on the rotation shaft of the barrier, the stop claw 117 and the solenoid 116) which are used for these different purposes. That feature likewise contributes to reduction in size and cost and simplification of the structural arrangement.

iv) As indicated by the distance & in FIG. 7, the viewfinder eyepiece is positioned away from the rear part of the camera by the distance & for the purpose of preventing the barrier from hitting the head of the camera user looking into the viewfinder eyepiece. This arrangement gives good operability.

Advantages peculiar to the embodiment as a camera are as follows.

v) The barrier 102 which has a relatively large area is arranged as a protection cover for the camera. The solar battery 105 is arranged on the outer surface of the barrier 102 while the reflection mirror part 102c is arranged on the reverse side of the barrier 102 to perform light condensing action. The arrangement enables each of these parts to carry out its function to a maximum extent without increasing the compact size of the camera body.

vi) The reflection mirror part 102c performing a light condensing action is arranged in an upper part of the camera, in such a way as to make the distance L shown in FIG. 2 longer when the barrier is fully open. With the reflection mirror part 102c used for lighting in taking a portrait, the red-eye phenomenon can be lessened, so that a good portrait can be taken to show a natural image, because the lighting is made from above the camera.

vii) If the solar battery 105 is omitted, the pop-up part becomes a barrier having only the reflection mirror part 102c. Then, since no connecting arrangement is necessary, the camera can be more simply arranged to permit further reduction in size and cost.

viii) The reflection mirror part 102c provided on the side of the barrier 102 and the front surface of the camera body are respectively in concave and convex shapes and, as apparent from FIG. 5, these shapes exactly match and coincide with each other when the barrier 102 is closed. Therefore, their shapes not only enhance the portability of the camera but also give a greater amount of latitude in the design of the camera.

Figure 10:
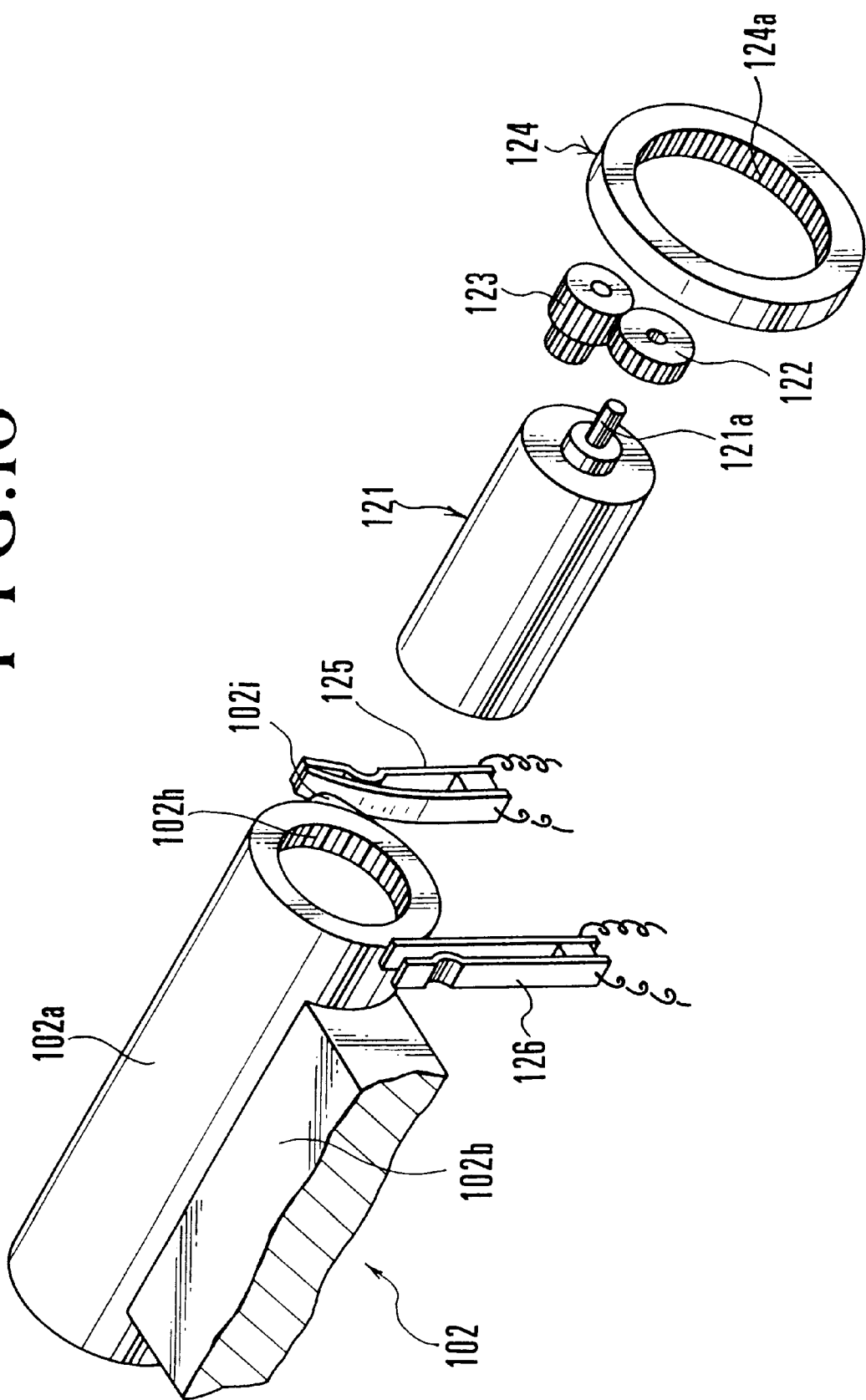
FIG. 10 is an exploded perspective view showing an essential mechanism of the camera of the first embodiment of this invention.

FIGS. 10 to 13(a) and 13(b) relate to a second embodiment of this invention. FIG. 10 shows in a perspective view only the essential parts of the camera which forms the second embodiment. Parts having the same functions as those of the first embodiment described above are indicated by the same reference numerals and all parts omitted from the illustration are arranged in the same manner as those of the first embodiment.

Referring to FIG. 10, a barrier 102 is swingably supported by the camera body through a rotation shaft 102a in the same manner as in the first embodiment. However, the barrier 102 of the second embodiment differs from that of the first embodiment in the following point. The inside of the rotation shaft 102a is hollow so as to contain therein a motor unit which consists of parts 121, 12,2 and 123 and is provided with an integrally formed inner gear 102h.

A motor 121 is supported by a known means within the rotation shaft 102a. A pinion gear 122 is press-fitted on the output shaft 121a of the motor 121 and is in mesh with a planet gear 123. The planet gear 123 is guided coaxially with the pinion 122 by a lever which is not shown. A known planetary gear mechanism is formed jointly by the pinion gear 122, the planet gear 123 and the lever. The planet gear 123 is a double gear. A larger gear part of the planet gear 123 is in mesh with an inner gear part 124a of an inner base plate 124 which is fixed to the camera body. The smaller gear part of the planet gear 123 is in mesh with the inner gear 102h of the rotation shaft 102a of the barrier 102 to form a known planetary reduction gear mechanism. When the planetary gear mechanism makes one turn, the rotation shaft 102a rotates to a degree which corresponds to the difference in the number of teeth between the inner gears 124a and 102h. In other words, the second embodiment is provided with a mechanism having a large reduction gear ratio.

Therefore, when the motor 121 is energized to rotate in the CCW or CW direction as viewed on the drawing, the barrier 102 is caused to swing in the direction of opening or closing at a large reduction gear ratio, that is, with a large torque.

A cam part 102j is formed integrally with the rotation shaft 102a of the barrier 102. In the state shown in FIG. 10 in which the barrier 102 is closed, a barrier closing switch 125 is pushed to turn on by the cam part 102j to transmit information on the closed state of the barrier 102 to a microcomputer which will be described later. A barrier full opening switch 126 is arranged to be pushed to turn on by the cam part 102j when the barrier 102 comes to its fully open position. The information on the fully open state of the barrier 102 is also sent to the microcomputer.

Figure 11:
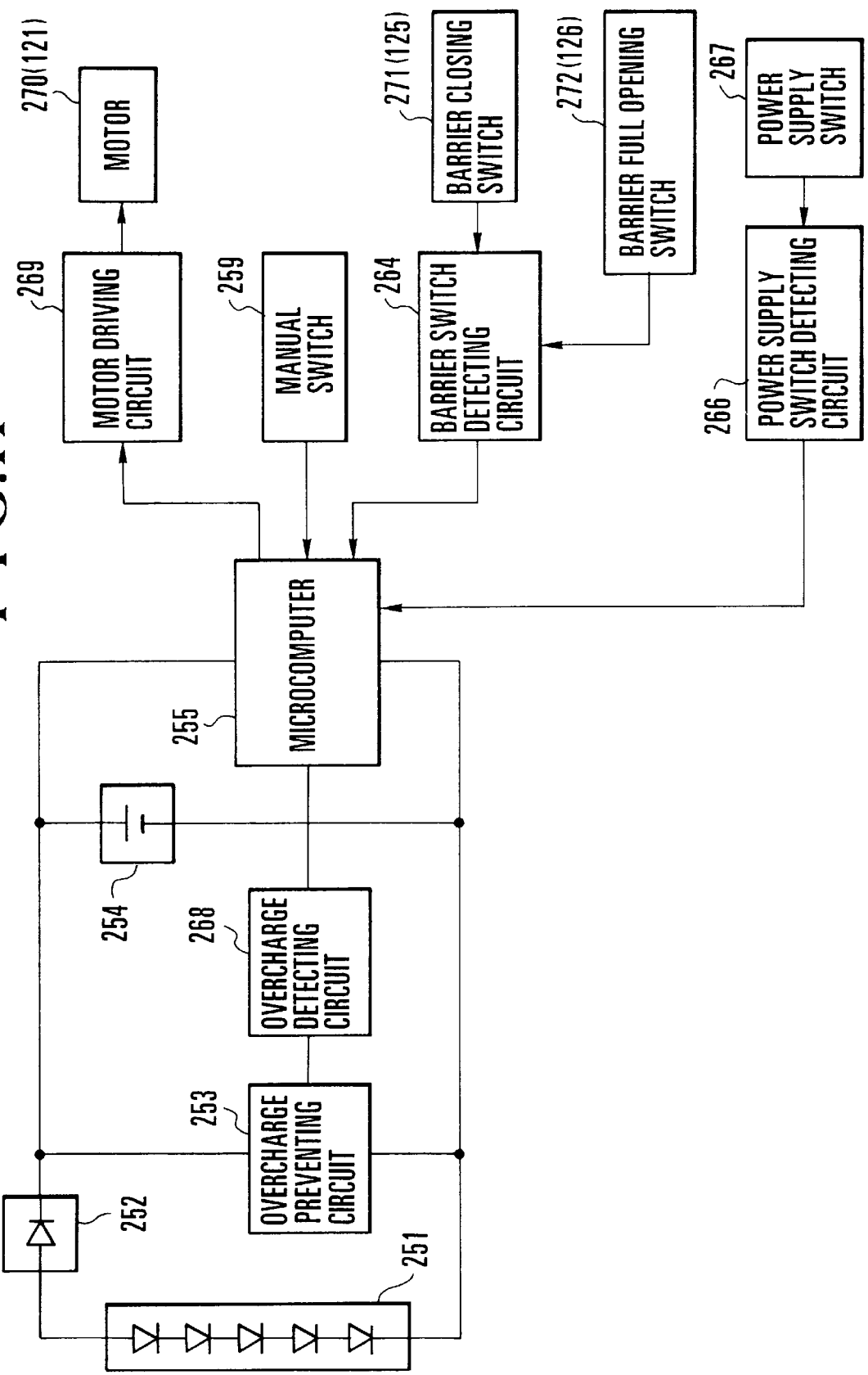
FIG. 11 is a block diagram showing the arrangement of the essential circuits and parts of a camera of the second embodiment of this invention.

FIG. 11 shows in a block diagram the arrangement of the essential circuits of the camera which is the second embodiment of this invention. Parts which are the same as those of the first embodiment are indicated by the same reference numerals in the drawing and their details are omitted from the following description.

Referring to FIG. 11, an overcharge detecting circuit 268 is arranged to detect whether an overcharge preventing circuit 253 has operated. A motor driving circuit 269 is arranged to control the driving action of a motor 270 (corresponding to the motor 121 of FIG. 10) in accordance with an instruction from the microcomputer 255. A manual switch 259 is provided for allowing the camera user to give an instruction for popping up the barrier 102 as a safety action for resisting heat. A barrier closing switch 271 which corresponds to the switch 125 of FIG. 10 is arranged to send a signal indicative of the closed state of the barrier 102 to the microcomputer 255 through a barrier switch detecting circuit 264. A barrier full opening switch 272 which corresponds to the switch 126 of FIG. 10 is arranged to send a signal indicative of the full open state of the barrier 102 to the microcomputer 255 also through the barrier switch detecting circuit 264.

Figure 12A:
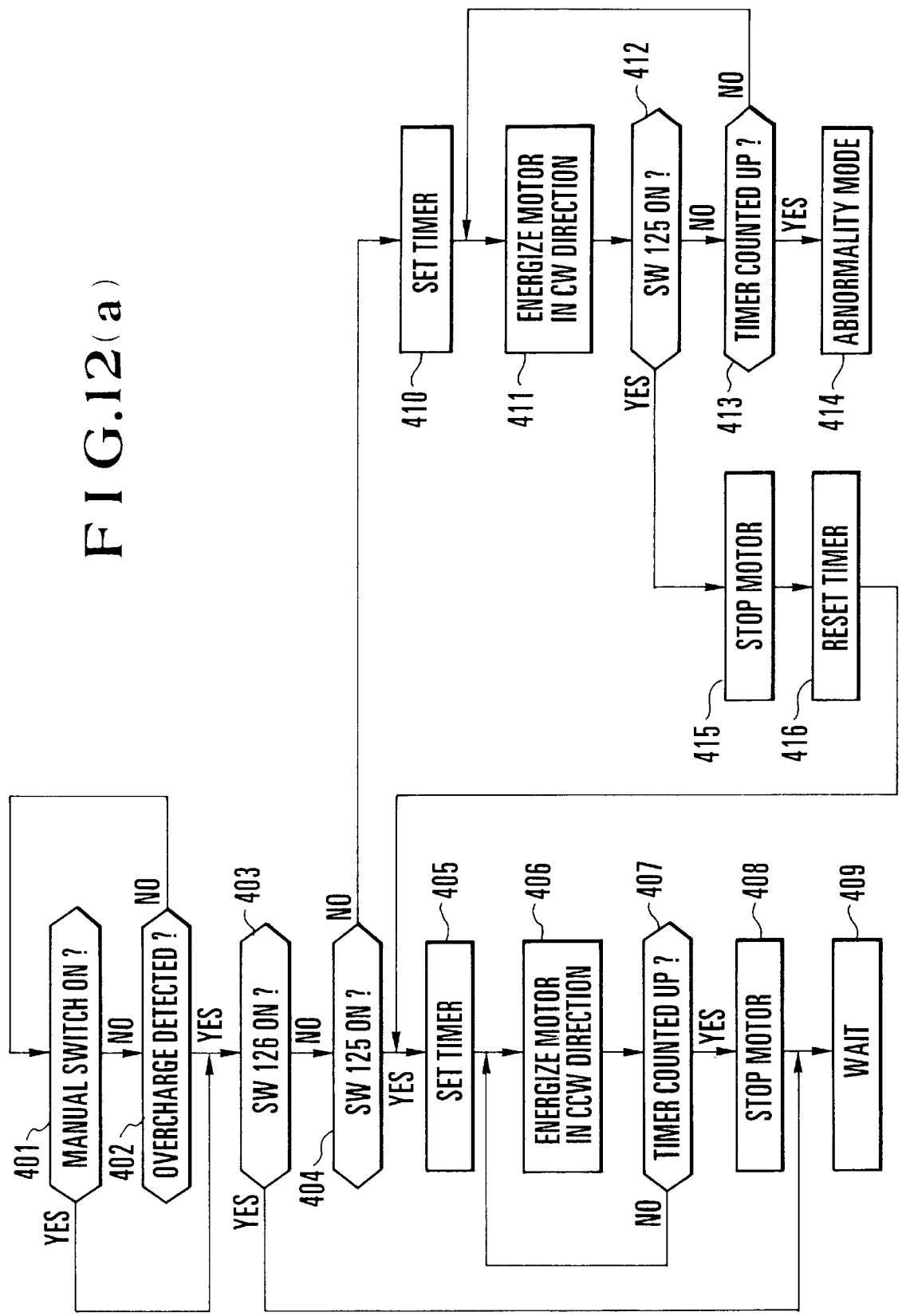
FIGS. 12(a) and 12(b) are flow charts respectively showing actions of the second embodiment performed when the safety mechanism of the second embodiment becomes operative and actions performed when the safety mechanism becomes inoperative.

An operation of the second embodiment to be performed by the microcomputer 255 in popping up the barrier 102 is described below with reference to FIG. 12 which is a flow chart showing this operation.

At step 401, a check is made of the state of the manual switch 259. When the microcomputer 255 finds that the manual switch 259 is turned on, the solar battery 251 disposed on the surface of the barrier 102 generates electrical energy and a secondary battery 254 begins to be charged with the electrical energy. At step 402, a check is made to find, through the overcharge detecting circuit 268, if the charging action on the secondary battery 254 is brought to a stop by the action of the overcharge preventing circuit 253 with the amount of electric charge having reached a predetermined value. If so, the flow of operation proceeds to step 403.

At step 403, the microcomputer 255 causes the barrier switch detecting circuit 264 to make a check of the state of the barrier full opening switch 272 (126). If the barrier full opening switch 272 is found to be in an on-state, it indicates that a photo-taking state has been obtained with the barrier 102 fully opened. Therefore, if so, the flow proceeds to step 409 to enter a standby state. If not, the flow proceeds to step 404. At the step 404, a check is made of the state of the barrier closing switch 271 (125). If the barrier closing switch 271 is found to be in its on-state thus showing that the barrier 102 is closed, the flow proceeds to a step 405. At step 405, an internal timer is set at a position for a predetermined period of time required in bringing the barrier 102 into the pop-up state. At step 406, the motor driving circuit 269 is caused to energize the motor 270 (121) to rotate in the CCW direction for opening the barrier 102. At step 406, the energizing action is allowed to continue until the set period of time is counted up by the timer, that is, until the pop-up state is obtained to provide an air layer required for resisting heat between the barrier 102 and the camera body. When this period of time is found to have been counted up by the timer at the step 407, the flow of operation proceeds to step 408 to stop the motor 270 (121) by deenergizing the motor 270 (121). At step 409, the flow waits for an input from some switch. In this state, the barrier 102 is in its pop-up position.

If the barrier closing switch 271 (125) is found not to be in its on-state at step 404, the flow of operation proceeds from step 404 to step 410. At step 410, the internal timer is set at a position for a predetermined period of time which is long enough for closing the barrier 102. At the next step 411, the motor 270 (121) begins to rotate in the CW direction for closing the barrier 102. At step 412, a check is made to find if the barrier closing switch 271 (125) has turned on. If not, the flow proceeds to step 413. At the step 413, the timer is checked to find if the set time has elapsed. If not, the flow returns to step 411 to continue the process of energizing the motor 270 (121) to rotate in the CW direction.

If the set time is found, at the step 413, to have elapsed, the motor 270 (121) or the motor power transmitting mechanism is considered to be out of order. In this instance, the flow comes to step 414 to enter an abnormality mode.

Further, if the barrier closing switch 271 (125) is found, at step 412, to have turned on before the set time is elapsed, the barrier 102 is considered to have returned to its closed state. In that instance, the flow proceeds to step 415. At the step 415, the process of energizing the motor 270 (121) for rotation in the CW direction is brought to an end. At step 416, the timer is temporarily reset and the flow executes the steps 405 to 409 described above.

Figure 12B:
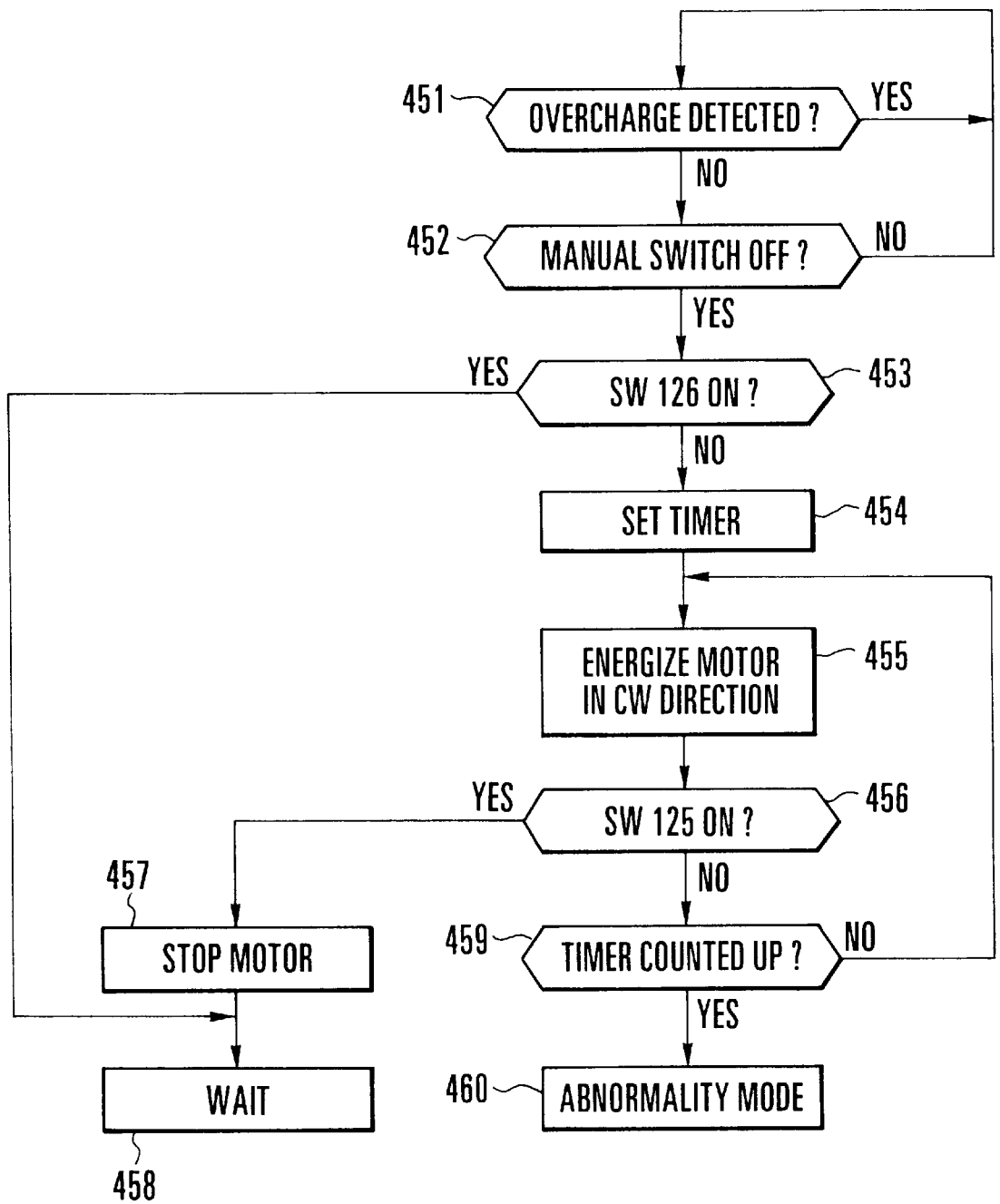

Operation to be performed by the microcomputer 255 for closing the barrier 102 from its pop-up state is next described with reference to FIG. 12(b) which is a flow chart.

At step 451, the microcomputer 255 checks the overcharge detecting circuit 266. If it is detected that the overcharge preventing circuit 253 has ceased to act, the flow of operation proceeds to step 452. At step 452, if the manual switch 259 is found to be in its off-state, the flow proceeds to step 453. At step 453, if the barrier full opening switch 272 (126) is found not to be in its on-state, the flow proceeds to step 454. At step 454, the internal timer is set at a time counting position for a predetermined period of time sufficiently long for closing the barrier 102. At step 455, the motor 270 (121) is caused, through the motor driving circuit 269, to drive (rotate) in the CW direction for closing the barrier 102. At step 456, a check is made to find if the barrier closing switch 271 (125) is in its on-state with the barrier 102 completely closed. If so, the flow proceeds to a step 457 to bring the rotation of the motor 270 to a stop. At step 458, the flow waits for an input from some switch.

If the on-state of the barrier closing switch 271 (125) is not detected before the set period of time is counted up by the timer at step 459, it is assumed that some abnormality has occurred and the flow comes to step 460 to enter an abnormality mode.

As described above, the second embodiment is designed such that, when the amount of electric charge for the secondary battery 254 reaches a predetermined value, the microcomputer 255 is operated to automatically bring the barrier 102 into the pop-up state. This arrangement prevents a rise of temperature to a degree at which some of the camera parts and the film might be damaged.

In the case where an apparatus such as a camera is left inside of an automobile under a midsummer sunlight, the apparatus tends to be damaged by the high temperature. A safety mechanism which acts by detecting such a high temperature is arranged, according to this invention, in a simple system to operate in a preemptive manner which may be expressed as [temperature→high illuminance→bypass circuit (overcharge detecting circuit) action]. The simple system is provided as a safety mechanism for resisting heat. More specifically, in a portable electronic apparatus such as a camera, for example, it is the film that is most vulnerable to a high temperature. In the case of a typical negative film (of sensitivity of ISO 400), however, no adverse effect becomes manifest in the photograph until the camera is left under an ambient temperature of 60° C. for a period of 100 hours. In the case of the camera embodying this invention, the secondary battery can be charged from its uncharged state to its full charged state in only 10 hours at the most, for example, under the above-stated condition of leaving the camera inside an automobile. Upon completion of charging, the microcomputer causes the safety mechanism to act for resisting heat. The above-stated preemptive operation takes only a period of 10 hours at the most to occur and leaves no serious damage in the apparatus.

Further, the embodiment may be designed to detect a degree of illuminance by an illuminance sensor or temperature by a temperature sensor, instead of detecting the charge state of the secondary battery 254.

Figure 13A:
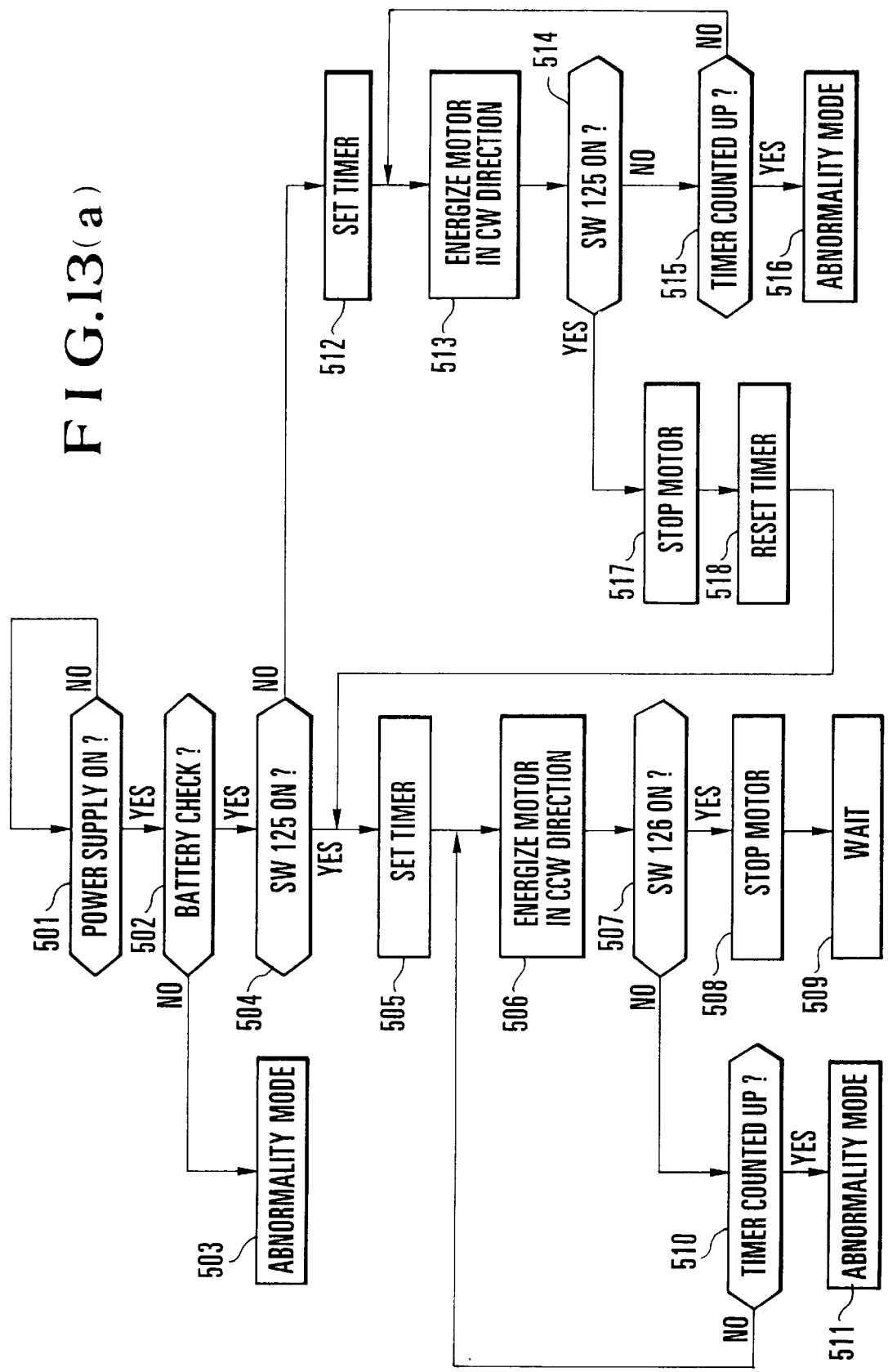
FIGS. 13(a) and 13(b) are flow charts respectively showing actions of the second embodiment performed when the power supply is turned on and actions performed when the power supply is turned off.

An operation of the second embodiment to be performed by the microcomputer 255 in fully opening the barrier 102 into the picture taking state is next described with reference to FIG. 13(a) which is a flow chart, as follows.

At step 501, the microcomputer 255 first makes a check through the power supply switch detecting circuit 266 to determine if the power supply switch 267 is closed. If so, the flow of operation proceeds to step 502. At step 502, a check is made of the state of the secondary battery 254 which is disposed within the camera body. If the secondary battery 254 is not found to be charged up to a predetermined capacity, the flow continues to step 503 to enter an abnormality mode, in which a warning is given to inform the camera user that the charge state of the battery is not sufficient.

If the secondary battery 254 is found to have a predetermined charge capacity value or above, the flow proceeds to step 504. At step 504, a check is made of the state of the barrier closing switch 271 (125). If the switch 271 is found in its on-state thus showing that the barrier 102 is closed, the flow continues to step 505. At step 505, the internal timer is set for a predetermined period of time which is long enough for fully opening the barrier 102. At step 506, the motor 270 (121) is energized and caused through the motor driving circuit 269 to rotate in the CCW direction for opening the barrier 102. At the next step 507, a check is made to determine if the barrier full opening switch 272 (126) has turned on. If not, the flow proceeds to step 510 to determine if the set time has been counted up by the timer. If not, the flow returns to the step 506 to continue the energizing action of the motor 270 (121) to allow it to continuously rotate in the CCW direction.

If it is found at step 510 that the timer has already counted up the set time while the barrier full opening switch 272 (126) has not turned on as yet, the flow proceeds to step 511. At step 511, the camera enters an abnormality mode to give a warning.

Further, if the barrier full opening switch 272 (126) is found by step 507 to have turned on before the set time is counted up by the timer, the flow of operation proceeds to step 508. At step 508, the motor 270 (121) is deenergized. At step 509, the flow enters a standby state until an input is received from some switch. In the standby state, the barrier 102 is in its full open position.

If, on the other hand, the barrier closing switch 271 (125) is found to not be in its on-state by step 504, the flow proceeds to step 512. At step 512, the internal timer is set for a predetermined period of time which is long enough for closing the barrier 102. At the next step 513, the motor 270 (121) is energized to rotate in the CW direction for closing the barrier 102. At step 514, a check is made to determine if the barrier closing switch 271 (125) has turned on. If not, the flow proceeds to step 515. At step 515, a check is made to find if the set time has been counted up by the timer. If not, the flow returns to step 513 to continue the process of energizing the motor 270 (121) to allow it to continuously rotate in the CW direction.

If the set time is found to have been counted up by the timer at step 515, this indicates occurrence of some abnormality in the motor 270 (121) or in the mechanism arranged to transmit the power of the motor. In this instance, the flow comes to step 516 to enter an abnormality mode.

Further, if the barrier closing switch 271 (125) is found at step 514 to have turned on, indicating that the barrier 102 has resumed its closed state, the flow proceeds to step 517. At step 517, the motor 270 (121) is deenergized to stop rotating in the CW direction. At step 518, the timer is temporarily reset and the above-stated steps 505 to 511 are executed.

Figure 13B:
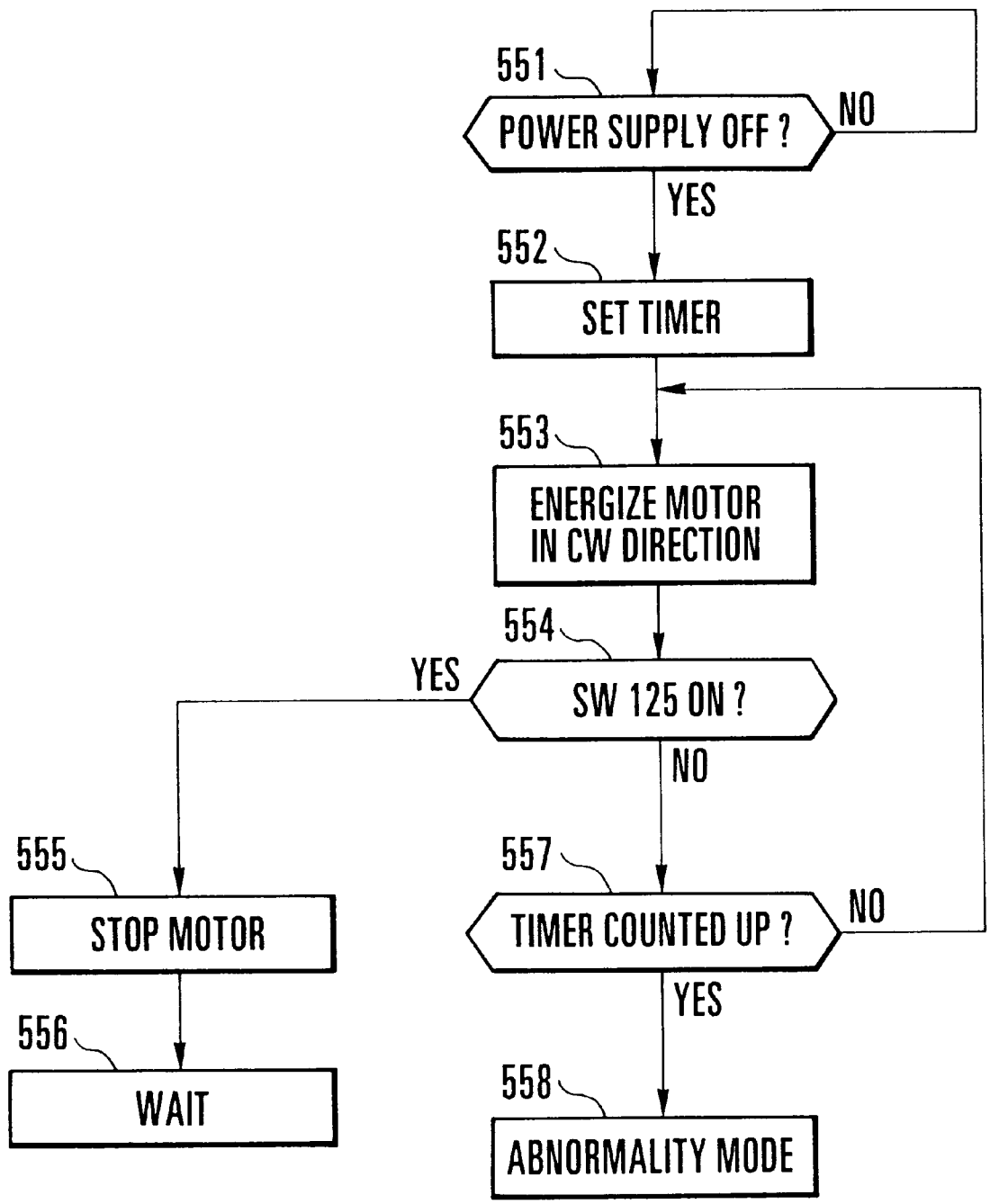

An operation of the microcomputer 255 for closing the barrier 102 from its full open state is described below with reference to FIG. 13(b) which is a flow chart.

When the power supply switch detecting circuit 266 detects that the power supply switch 267 has turned off, the flow of operation proceeds to step 552. At step 552, the microcomputer 255 sets the internal timer for a predetermined period of time sufficient for closing the barrier 102 from its full open state. At step 553, the motor driving circuit 269 is caused to drive the motor 270 (121) to rotate in the CW direction for closing the barrier 102. At step 554, a check is made to determine if the barrier closing switch 271 (125) has turned on with the barrier 102 completely closed. If so, the flow comes to step 555 to bring the motor 270 (121) to a stop. At step 556, the flow enters into a standby state to wait for an input from some switch.

If the on-state of the barrier closing switch 271 (125) is not detected at step 557 before the set time is counted up, it is considered that some abnormality has occurred, and the flow proceeds to step 558 to enter the abnormality mode.

The second embodiment described above has the following advantages.

i) Since the wire made of a shape memory alloy used for the first embodiment is not necessary, the pop-up part can be simply arranged as the wiring work and space for the wire are not necessary.

ii) Since it is not necessary to vary the mode of energizing the barrier 102 according to the temperature of the environment, a control circuit can be simply arranged. Further, the operating time does not vary with the ambient temperature.

FIGS. 14(a) and 14(b) and FIGS. 15(a) to 15(c) show a third embodiment of an electronic apparatus of the invention having a solar battery. In the third embodiment, the invention is applied to a portable telephone set. In other words, the shape memory alloy wire of the first embodiment or the motor unit of the second embodiment is assumed to be incorporated in the portable telephone set as a safety mechanism for resisting heat.

Figure 14A:
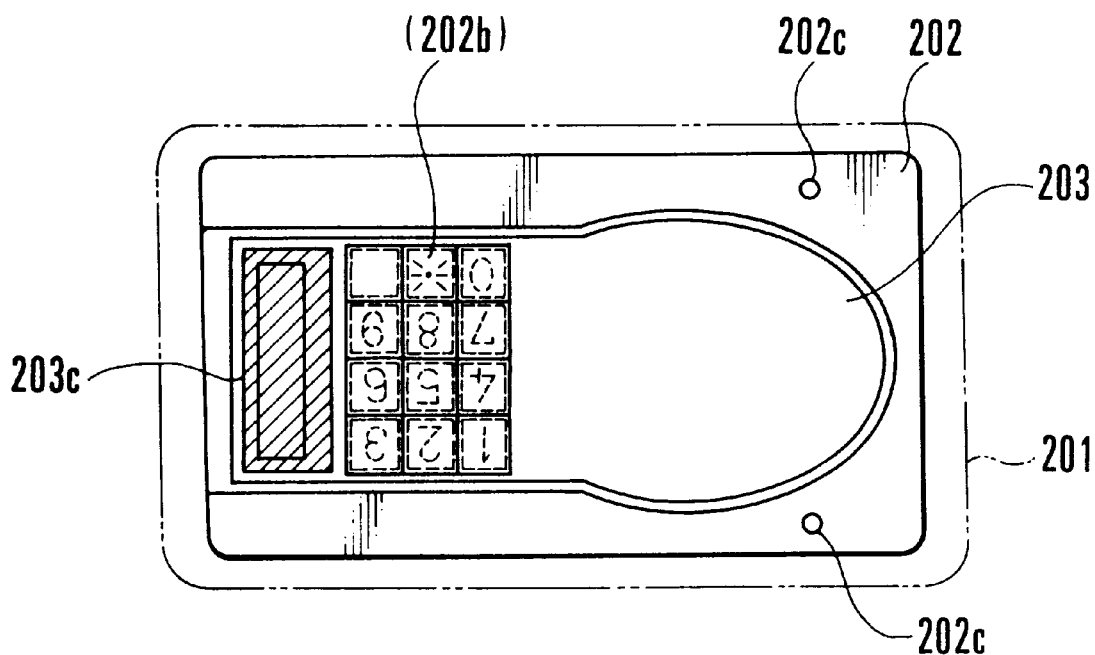
FIGS. 14(a) and 14(b) are plan views showing a portable telephone set according to a third embodiment of this invention, when a cover is removed and when the cover is closed.
Figure 14B:
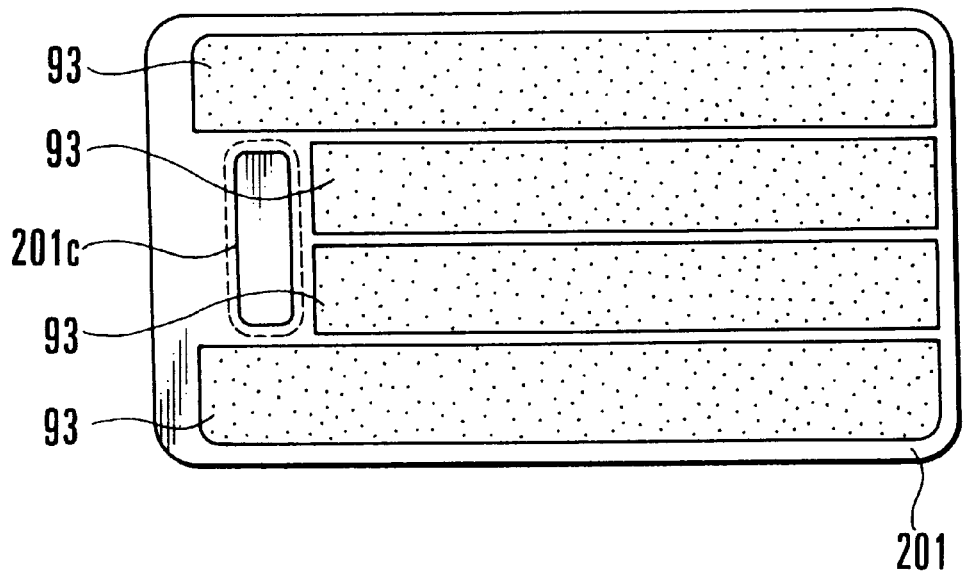
Figure 15A:
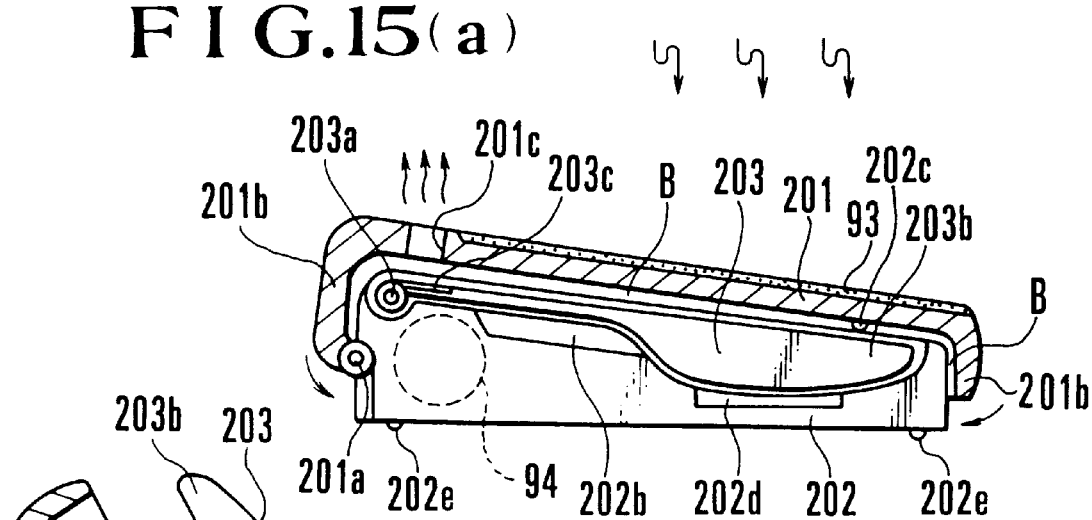
FIGS. 15(a), 15(b), and 15(c) are sectional views showing the same portable telephone set in its various states including those shown in FIGS. 14(a) and 14(b).
Figure 15B:
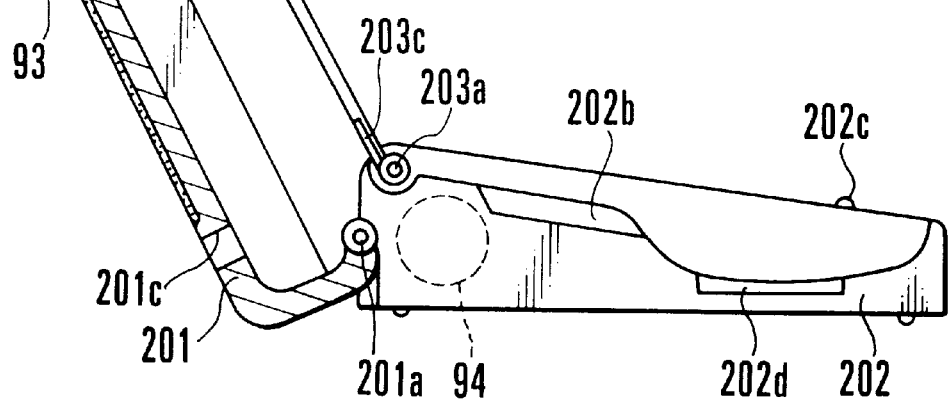
Figure 15C:
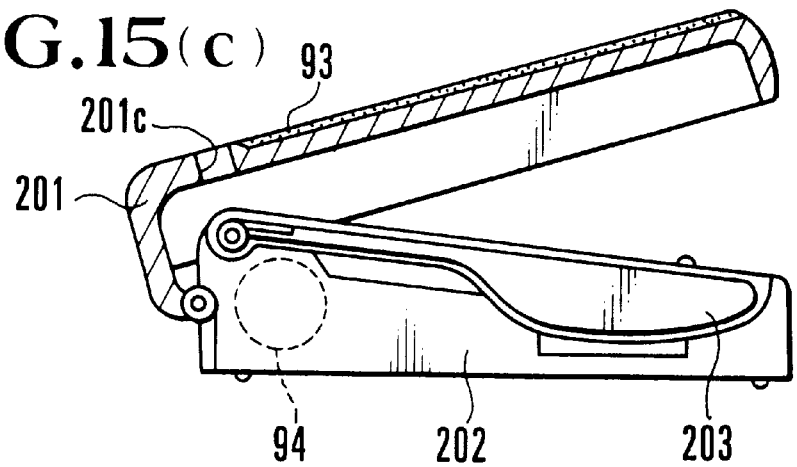
Figure 16A:
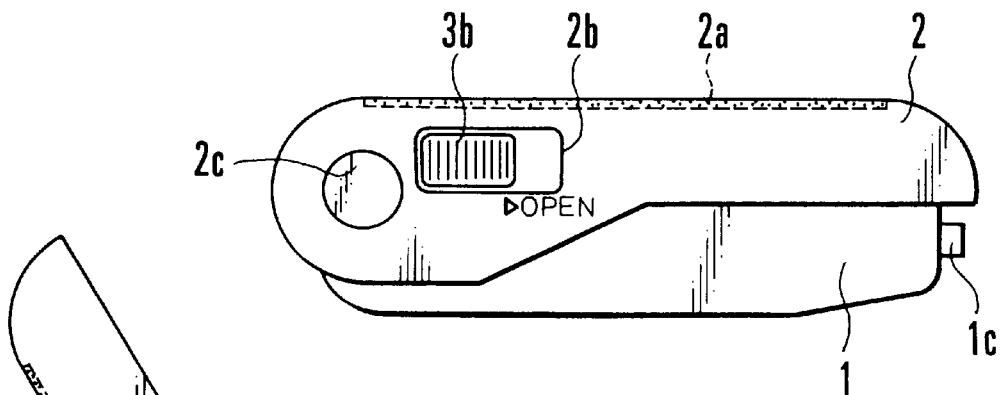
FIGS. 16(a), 16(b), and 16(c) are bottom views showing various states of a camera to which a prior art overheating prevention arrangement is applied.
Figure 16B:
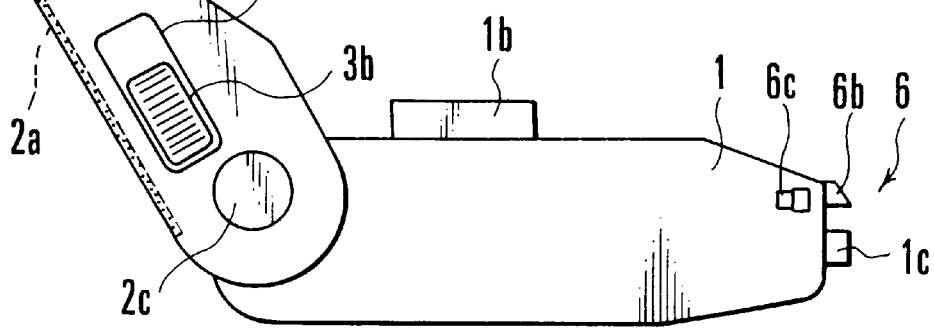
Figure 16C:
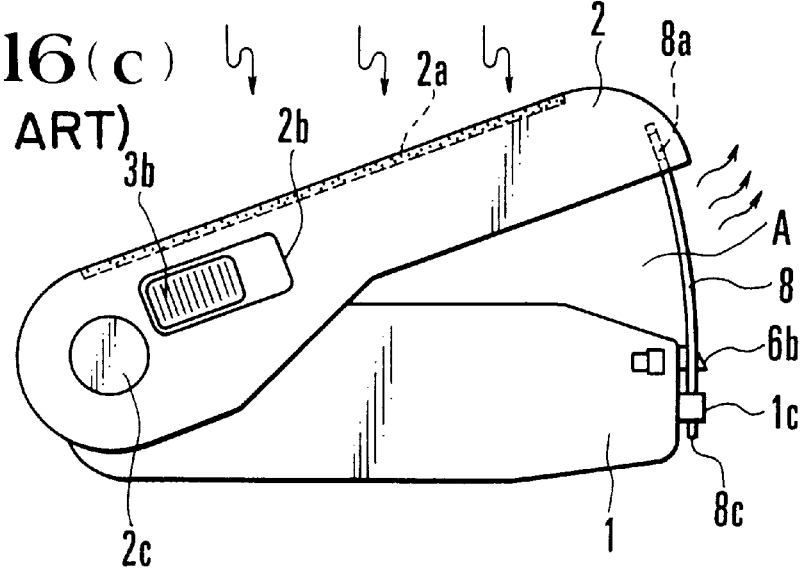
Figure 17:
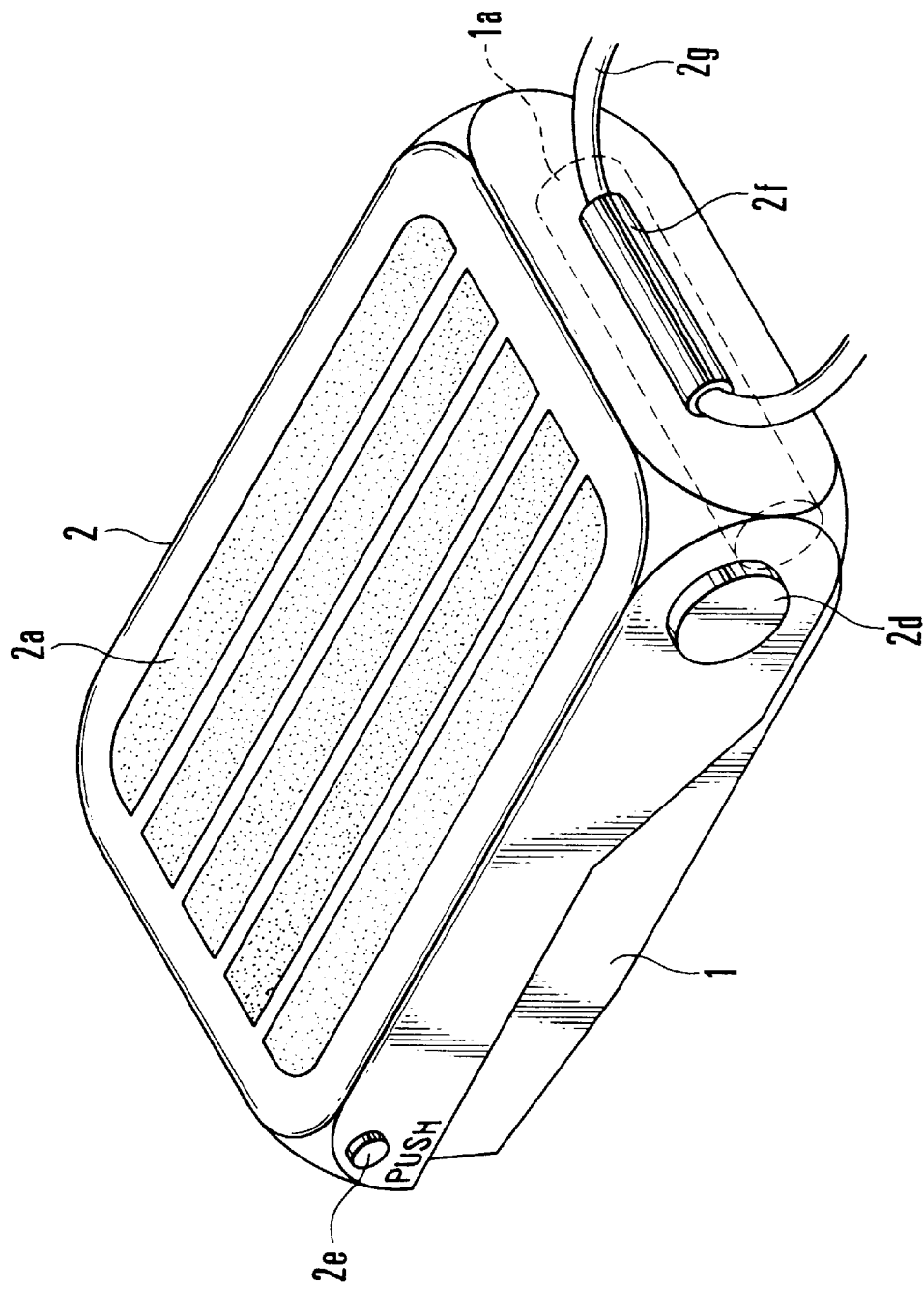
FIG. 17 is a perspective view of the camera shown in FIGS. 16(a), 16(b) and 16(c).
Figure 18:
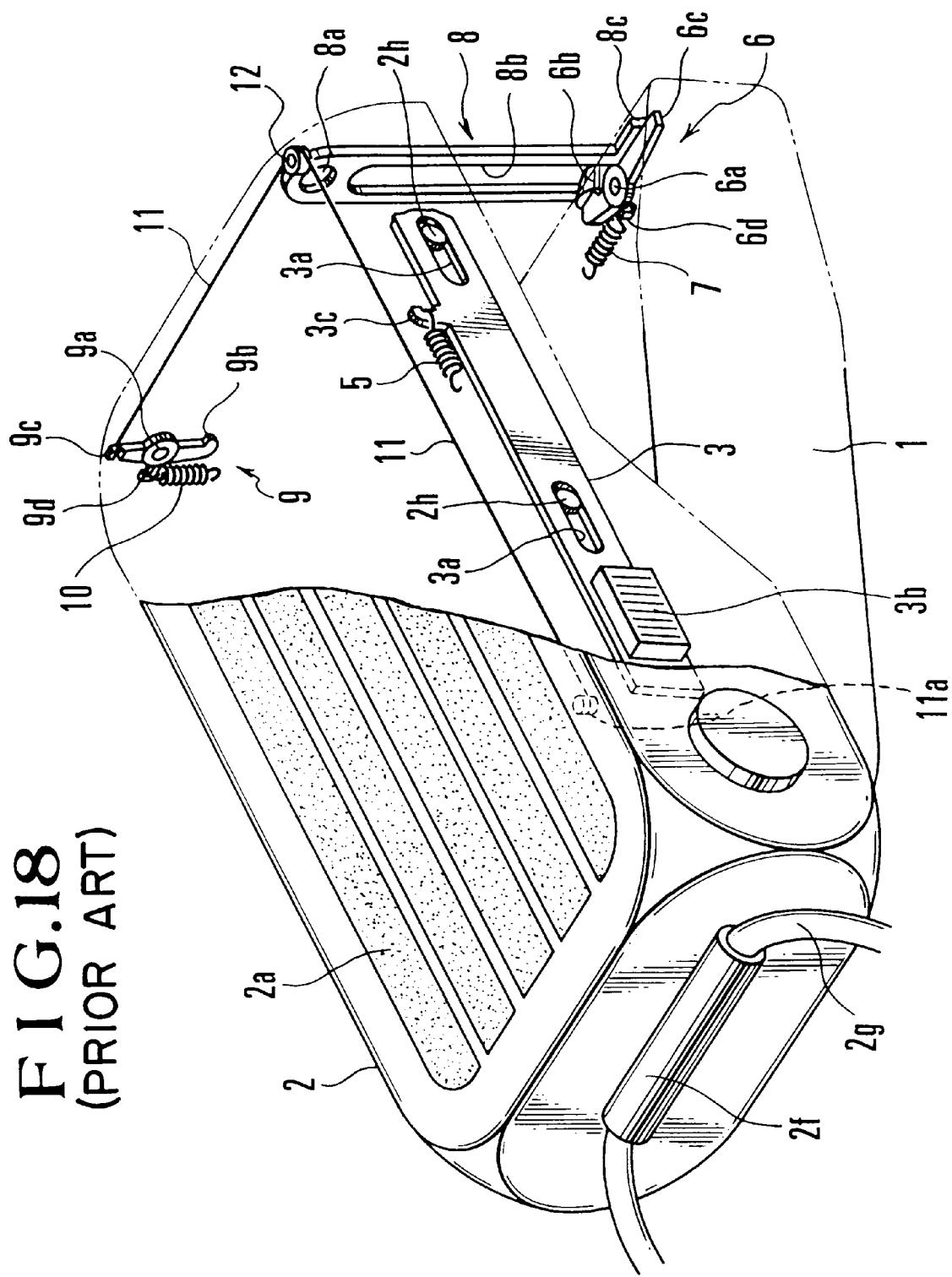
FIG. 18 is a perspective view showing the internal arrangement of the same camera of the prior art when the camera is brought into a pop-up state from the state of FIG. 17 by the action of a wire made of a shape memory alloy.
Figure 19:
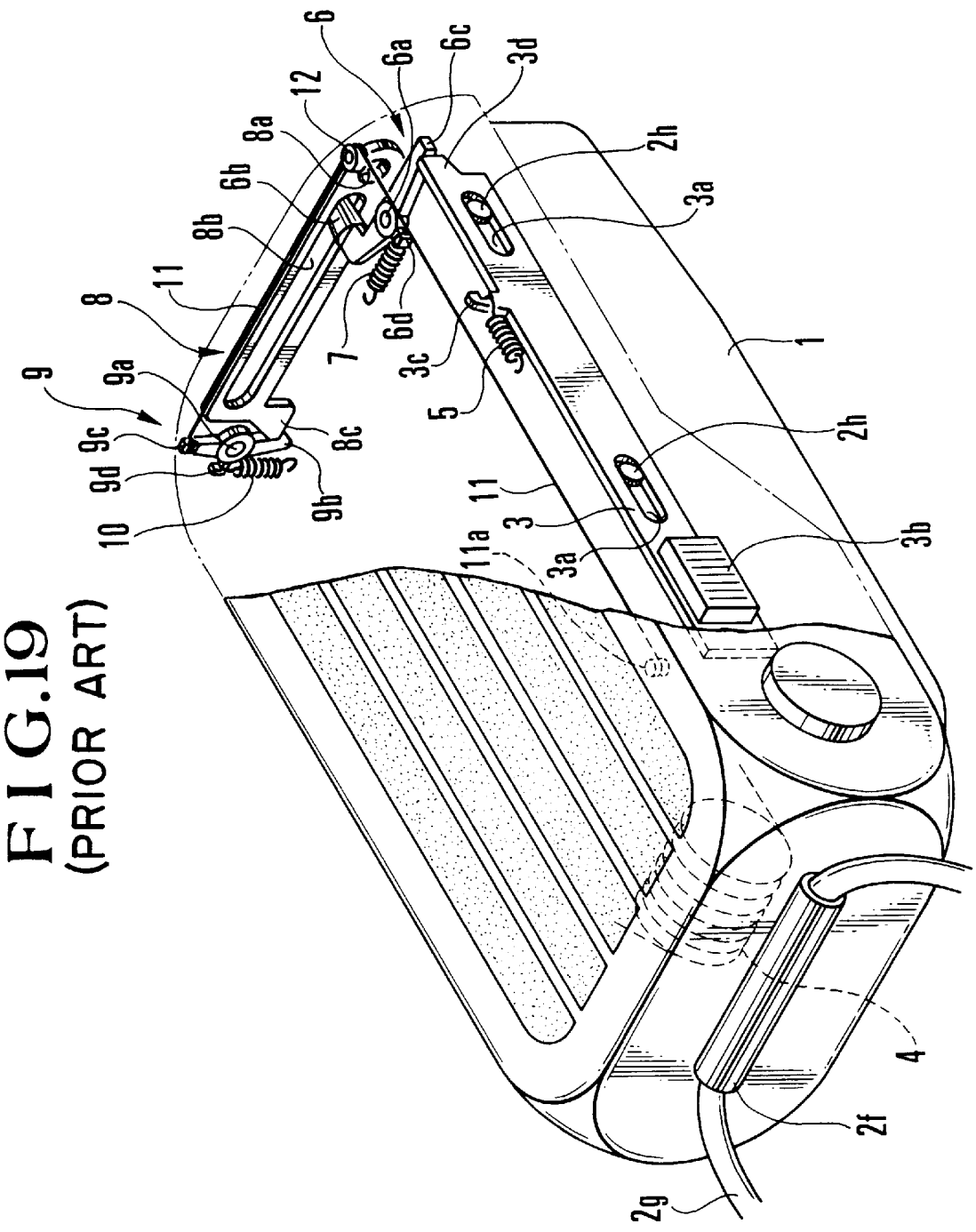
FIG. 19 is a perspective view showing the internal arrangement of the same prior art camera with the cover closed.
Figure 20:
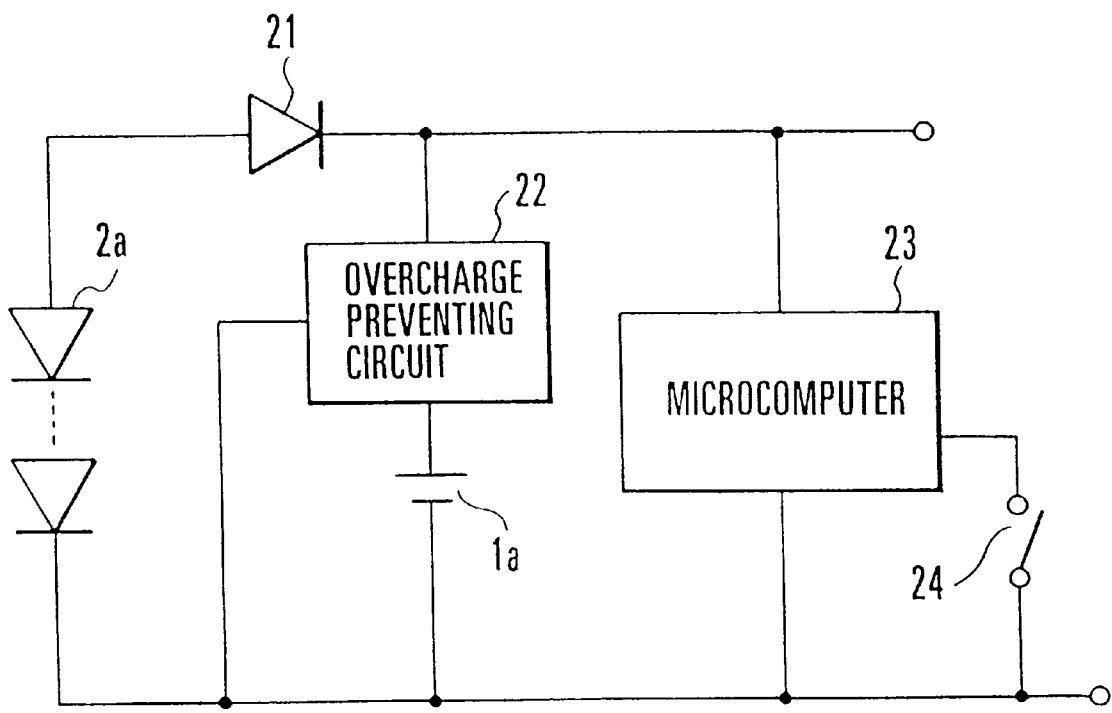
FIG. 20 is block diagram showing the essential parts and circuit arrangement of the camera of FIGS. 16(a), 16(b), and 16(c).

FIG. 14(a) shows the telephone set with a cover removed from the body of the telephone set. FIG. 14(b) is a top view showing the telephone set with the cover closed. FIG. 15(a) is a side view showing the same telephone set with the cover closed. FIG. 15(b) is a side view showing the same telephone set with the cover opened. FIG. 15(c) shows the cover in a pop-up state.

The safety mechanism for resisting heat of the third embodiment is omitted from the drawings as it is similar to that of the first or second embodiments described in the foregoing.

A box-like cover 201 is supported by a portable telephone set body 202 (electronic apparatus) and is pivotable on a hinge shaft 201a. On the outer surface of the cover 201 are arranged solar cells 93, as shown in FIG. 14(b). The solar cells 93 are connected in series by wiring within the cover 201. A wiring lead connects the solar cells 93 through the hinge shaft 201a and a reverse-blocking diode (not shown) to a lithium-ion secondary battery 94 which is disposed within the body 202.

The body 202 is provided with projections 202c for forming an air layer B between the cover 201 and the body 202, as shown in FIG. 15(a). The air layer B is formed also between the side face 201b of the cover 201 and the body 202. The cover 201 is provided with a ventilation hole 201c as shown in FIG. 15(a). With the solar battery cells 93 exposed to direct sunlight, the temperature of the cover 201 rises while the secondary battery 94 is charged with the electrical energy generated by the solar battery cells 93 under the direct sunlight. The temperature of the air layer B on the reverse side of the cover 201 rises with that of the cover 201. Then, a convection of air takes place as indicated by arrows in FIG. 15(a). Peripheral external air is sucked in through a clearance between the side face 201b of the cover 201 and the body 202 and flows to escape from the ventilation hole 201c. The air layer B on the reverse side of the cover 201 is thus kept at about the same temperature as the ambient air by virtue of the air flow. The temperature of the body 202 thus can be suppressed from rising to keep it about the same as the ambient-temperature.

The body 202 includes a microphone part 202d which is connected to a circuit part which is not shown and a push-button part 202b which is arranged as shown by broken lines in FIG. 14(a).

A speaker 203 is supported by a hinge shaft 203a to be pivotable thereon relative to the body 202. The speaker 203 has, at its fore end, a speaker part 203b with a sounding body contained therein. The speaker 203 is provided with a reflection part (plated part) 203c which is in a position to be opposed to the ventilation hole 201c when the cover 201 is closed as shown in FIGS. 14(b) and 15(a). The reflection part 203c is arranged to reflect direct sunlight coming in at an angle which is approximately in parallel to the ventilation hole 201c and to let the light exit the cover 201, so that the heat of the sunlight is prevented from being fully transmitted to the speaker part 203b by this action of the reflection part 203c. Therefore, the surface of the reflection part 203c is formed to be approximately perpendicular to the ventilation hole 201c.

Further, the reflection part 203c is formed at the electrical fitting part, i.e., a part arranged to have the highest heat resistivity, of the speaker 203 and is connected only through the hinge shaft 203a to the body 202 which has complex functional parts and the lithium-ion secondary battery 94. Therefore, even when the reflection part 203c itself has a high temperature, the body 202 and the secondary battery 94 are not excessively affected by the temperature.

As apparent from the above description, with this invention applied to the portable telephone set, the advantageous effects of this invention are attainable in the same manner as in the cases of the first and second embodiments.

In other words, with the portable telephone set provided with the safety mechanism designed to protect against heat in the same manner as in the case of the first embodiment, the following advantages can be attained.

i) In the portable telephone set having the solar battery on the cover 201, an actuator which is provided for protecting various component parts from heat and another actuator which is provided for opening the cover 201 by turning on the power supply are arranged to be a common actuator which is a wire of a shape memory alloy. In addition to that, a member used for closing the cover 201 when the temperature drops and another member used for closing the cover 201, for example, when the power supply is turned off are formed as common member which is a spring. This arrangement effectively contributes to reduction in size and cost as well as simplification of the structural arrangement of the portable telephone set.

ii) The wire made of a shape memory alloy is reactive both to the heat sensing action and to heat resulting from energizing. This feature also effectively contributes to reduction in size and cost as well as simplification of the structural arrangement of the portable telephone set.

iii) Members used for holding the cover 201 in its full open state and members used for holding the cover in predetermined partially opened extent are formed as the same members (the cam part provided on the rotation shaft of the cover). That feature likewise contributes to reduction in size and cost and simplification of the structural arrangement of the portable telephone set.

In a case where the portable telephone set is provided with a safety mechanism for resisting heat in the same manner as in the second embodiment, the following advantageous effects can be attained.

iv) Since the wire which is made of a shape memory alloy is not used, the pop-up part can be simply arranged because the wiring mechanism and space for the wire are not necessary.

v) Since it is not necessary to vary the mode of energizing the cover 201 according to the temperature of environment, a control circuit can be simply arranged. Further, the operating time does not vary with the ambient temperature.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions. Further, the individual components shown in schematic or block form in the drawings are all well-known in the camera arts and their specific construction and operation are not critical to the operation or best mode for carrying out the invention.

Further, this invention may be carried out by combining as necessary the embodiments or their technological elements described in the foregoing.

This invention also applies to cases where either the whole or a part of claims or the arrangement of each embodiment described forms one apparatus or is used in combination with some other apparatus or as a component element of an apparatus.

Further, this invention is applicable to cameras of various kinds, such as a single-lens reflex camera, a lens-shutter type camera, a video camera, etc., optical apparatuses other than cameras; other apparatuses, devices adapted for cameras, optical apparatuses and other apparatuses, and component elements which form these apparatuses and devices.

What is claimed is:

1. An apparatus adapted to mount thereon a solar battery comprising:
   a) a driving device for driving said apparatus into a first state for reducing an influence of increase of temperature on said apparatus; and
   b) a control device for driving said apparatus into a second state different from said first state by electrically controlling said driving device.

2. An apparatus according to claim 1, wherein said apparatus is an electronic apparatus.

3. An apparatus according to claim 1, wherein said apparatus is a camera.

4. An apparatus according to claim 1, wherein said apparatus is a telephone.

5. An apparatus according to claim 1, wherein said apparatus includes a cover and wherein said driving device opens said cover into said first state.

6. An apparatus according to claim 5, wherein said control device opens said cover into said second state in a different opening manner from opening said cover into said first state.

7. An apparatus according to claim 5, wherein said driving device also closes said cover.

8. An apparatus according to claim 1, wherein said apparatus includes a cover and wherein said solar battery is disposed on said cover.

9. An apparatus according to claim 1, wherein said driving device drives said apparatus according to ambient temperature.

10. An apparatus according to claim 1, wherein said apparatus includes a battery chargeable by said solar battery and wherein said driving device drives said apparatus according to the state of charge of said chargeable battery.

11. An apparatus according to claim 1, wherein said driving device includes a shape memory alloy.

12. An apparatus according to claim 1, wherein said driving device includes a motor.

13. An apparatus according to claim 1, wherein said apparatus includes a cover and further comprises closing means for closing said cover.

14. An apparatus according to claim 13, wherein said closing means includes an elastic member.

15. An electronic apparatus having a rechargeable battery, an openable and closable cover, a solar battery disposed on said cover and adapted to supply electrical charge to said rechargeable battery, and control means operable for effecting both opening and closing of said cover, said control means being operatively responsive to at least one of ambient temperature in said apparatus and charge condition of said rechargeable battery.

16. An electronic apparatus according to claim 15, wherein said control means includes a temperature sensitive element in position controlling relation to said cover.

17. An electronic apparatus according to claim 16, wherein said cover is openable to a first opening amount and wherein said temperature sensitive element is responsive to a given ambient temperature increase in said apparatus for causing said control means to open said cover to said first opening amount.

18. An electronic apparatus according to claim 16, wherein said temperature sensitive element is responsive to a given ambient temperature decrease in said apparatus for causing said control means to close said cover.

19. An electronic apparatus according to claim 15, wherein said cover is openable to a second opening amount exceeding said first opening measure, said control means further including means for supplying electrical current to said temperature sensitive element for causing said control means to open said cover to said second opening amount.

20. An electronic apparatus according to claim 15, wherein said control means includes a motor in position controlling relation to said cover.

21. An electronic apparatus according to claim 20, wherein said control means operates said motor selectively in response to charge states of said rechargeable battery.

22. An electronic apparatus having a rechargeable battery, a body portion, an openable and closable cover supported by said body portion, a solar battery disposed on said cover and adapted to supply electrical charge to said rechargeable battery, and a driving member connected between said cover and said body portion, said doing member being responsive both the increases in ambient temperature and to electrical current furnished to said driving member for effecting opening of said cover.

23. An electronic apparatus according to claim 22, wherein said driving member is further responsive to decreases in ambient temperature for effecting closing of said cover.

24. An apparatus adapted to mount thereon a solar battery comprising:
a) a driving device for automatically driving said apparatus in accordance with a state of an ambient temperature influence on said apparatus; and
b) a control device for electrically controlling said driving device in accordance with a user's operation irrespective of the state of the ambient temperature influence on said apparatus.

25. An apparatus according to claim 24, wherein said apparatus includes a cover and wherein said driving device opens said cover.

26. An apparatus according to claim 25, wherein said driving device also closes said cover.

27. An apparatus according to claim 24, wherein said driving device includes a shape memory alloy.

28. An apparatus according to claim 24, wherein said driving device includes a motor.

29. An apparatus according to claim 24, further comprising a closing device which closes a cover of said apparatus.

30. An apparatus according to claim 29, wherein said closing device includes an elastic member.

31. An apparatus according to claim 24, wherein said apparatus includes a cover and wherein said driving device closes said cover.

32. An apparatus adapted to mount thereon a solar battery comprising:
a driving device for automatically reducing a space between said apparatus and said solar battery in accordance with a state of an ambient temperature influence on said apparatus.

33. An apparatus according to claim 32, wherein said apparatus includes an electronic apparatus.

34. An apparatus according to claim 32, wherein said apparatus includes a telephone.

35. An apparatus according to claim 32, further comprising a cover on which said solar battery is disposed, wherein said driving device drives said cover.

36. An apparatus according to claim 32, wherein said driving device also extends said space between said apparatus and said solar battery in accordance with the state of the ambient temperature influence on said apparatus.

37. An apparatus according to claim 32, wherein driving device also extends said space between said apparatus and said solar battery irrespective of ambient temperature.

38. An apparatus according to claim 32, wherein said driving device includes an elastic member.

39. An apparatus according to claim 32, wherein said driving device includes a motor.

40. An apparatus according to claim 32, further comprising an extending device which automatically extends said space between said apparatus and said solar battery in accordance with the state of the ambient temperature influence on said camera.

41. An apparatus according to claim 40, wherein said extending device includes a shape memory alloy.

42. An apparatus according to claim 32, further comprising an extending device which automatically extends said space between said apparatus and said solar battery.

43. An apparatus according to claim 42, wherein said extending device includes a shape memory alloy.

44. An apparatus adapted to mount thereon a solar battery comprising:
a driving device for automatically extending and reducing a space between said apparatus and said solar battery in accordance with a state of an ambient temperature influence on said apparatus.

45. An apparatus according to claim 44, wherein said apparatus includes an electronic apparatus.

46. An apparatus according to claim 44, wherein said apparatus includes a telephone.

47. An apparatus according to claim 44, further comprising a cover on which said solar battery is disposed, wherein said driving device drives said cover.

48. An apparatus according to claim 44, wherein said driving device includes a motor.

49. An apparatus according to claim 44, wherein said driving device comprises a combination of a shape memory alloy and an elastic member.

* * * * *

UNITED STATES PATENT AND TRADEMARK OFFICE
CERTIFICATE OF CORRECTION

PATENT NO.        : 6,096,969
APPLICATION NO. : 08/561046
DATED             : August 1, 2000
INVENTOR(S)       : Masahiro Fujita et al.

It is certified that error appears in the above-identified patent and that said Letters Patent is hereby corrected as shown below:

Title Page, item [57], line 3, delete "redetermined" and insert -- predetermined --.
Col. 1, line 41, delete "photo-taking lens barrel 1b" and insert -- the lens barrel 1b --.
Col. 4, line 50, delete "and a film" and insert -- and the film --.
Col. 7, line 7, after "perspective" delete -- oblique --.
Col. 10, line 22, delete "attract the armature" and insert -- attract the lever --.
Col. 10, line 56, delete "&" and insert -- δ --.
Col. 11, line 41, delete "261 (114) shrinks" and insert -- 261 (114) contracts --.
Col. 13, line 35, delete "&" and insert -- δ --.
Col. 13, line 37, delete "&" and insert -- δ --.
Col. 14, line 21, delete "12,2" and insert -- 122, --.
Col. 16, line 31, delete "flow comes to" and insert -- flow proceeds to --.
Col. 18, line 14, delete "flow comes to" and insert -- flow proceeds to --.
Col. 19, line 12, delete "ambient-temperature" and insert -- ambient temperature --.
Col. 20, line 2, delete "in predetermined" and insert -- in a predetermined --.
Col. 21, line 60, delete "doing member" and insert -- driving member --.

Signed and Sealed this

Fifteenth Day of January, 2008

JON W. DUDAS
*Director of the United States Patent and Trademark Office*